United States Patent [19]

Marimont et al.

[11] Patent Number: 5,710,877
[45] Date of Patent: Jan. 20, 1998

[54] USER-DIRECTED INTERACTION WITH AN IMAGE STRUCTURE MAP REPRESENTATION OF AN IMAGE

[75] Inventors: David H. Marimont; Leonidas John Guibas, both of Palo Alto, Calif.

[73] Assignee: Xerox Corporation, Stamford, Conn.

[21] Appl. No.: 581,660

[22] Filed: Dec. 29, 1995

[51] Int. Cl.$^6$ .................................................. G06F 15/00
[52] U.S. Cl. ........................................................ 395/427
[58] Field of Search .................................. 395/127, 133, 395/119; 345/113, 114, 117

[56] References Cited

U.S. PATENT DOCUMENTS

| | | | |
|---|---|---|---|
| 4,631,690 | 12/1986 | Corthout et al. | 364/518 |
| 4,914,605 | 4/1990 | Loughmiller, Jr. et al. | 364/518 |
| 5,440,652 | 8/1995 | Ting | 382/165 |
| 5,485,568 | 1/1996 | Venable et al. | 395/155 |
| 5,499,322 | 3/1996 | Thirion et al. | 395/118 |
| 5,546,107 | 8/1996 | Deretsky et al. | 395/600 |
| 5,583,953 | 12/1996 | Harrington | 382/239 |
| 5,586,232 | 12/1996 | Yoshida | 395/127 |

OTHER PUBLICATIONS

Ketan Mulmuley, *Computational Geometry: An introduction Through Randomized Algorithms*, Prentice–Hall, 1994, ch. 2, pp. 29–35, 52–55, 58–66, and 78–96; ch. 3, pp. 111–114 and 117–119; ch. 4, pp. 126–135, 140–149, and 162–167; and ch. 5, pp. 192–210.

Adobe Photoshop™ 2.5 for Macintosh, *User Guide and Tutorial*, pp. 15–29 and pp. 79–86; Adobe Systems Incorporated, Mountain View, California, 1993.

Colorize 2.0™ (DS Design Inc. of Cary, North Carolina), software product review in *MacWEEK*, p. 30, Jul. 24, 1995.

G. Koepfler, C. Lopez and J.M. Morel, "A Multiscale Algorithm for Image Segmentation by Variational Method," *Journal of Numerical Analysis of the Society of Industrial and Applied Mathematics*, vol. 31, No. 1, Feb. 1994, pp. 282–299.

L. Guibas and D. Marimont, "Rounding Arrangements Dynamically," *Proceedings of the 11th ACM Symposium on Computational Geometry (SCG '95)*, Vancouver, B.C., Jun., 1995.

Daniel H. Greene and Frances F. Yao, "Finite–Resolution Computational Geometry," *Proc. 27th Ann. Symp. on Foundations of Computer Science*, 1986, pp. 143–152.

Ketan Mulmuley, in "A fast planar partition algorithm I", *Journal of Symbolic Computation*, v. 10, 1990, pp. 253–280.

(List continued on next page.)

*Primary Examiner*—Phu K. Nguyen
*Attorney, Agent, or Firm*—Judith C. Baves

[57] ABSTRACT

A data structure representation of an image called an image structure map (ISM) accurately and explicitly represents the geometry, topology and signal properties of regions in an original image and allows for efficient and accurate spatial indexing of the image and those regions. The ISM may serve as the basis for an image interaction system in which a user interacts with a rendered view of an original image that is produced from the ISM data structure. The rendered view of the original image represents the geometry and topology of the original image as represented in the ISM. The user interacts with the rendered view to make alterations to, or to query, the structures in the ISM. The user may also modify the ISM by interacting directly with a displayed view of the original image. The user may further invoke automatic operations to be performed using the original image data structure that produce image region data, such as signal property descriptors and boundary data, that may be used to modify the ISM. An image interaction system implemented in this manner takes full advantage of automatic computation methods to capture the geometric and topological properties of an image while permitting a user to employ human perceptual skills to augment the automatic operations. An illustrated implementation of the system uses an ISM having the form of a vertical cell decomposition that is mathematically robust, topologically consistent with the original image and is able to be modified dynamically—that is, without recomputing the entire ISM when a change is made.

24 Claims, 24 Drawing Sheets

OTHER PUBLICATIONS

Ketan Mulmuley, "Randomized Multidimensional Search Trees: Dynamic Sampling," *Proceedings of the 7th ACM Symposium on Computational Geometry* (SCG,) 1991, pp. 121–131.

H. Edelsbrunner, L. Guibas, J. Pach, R. Pollack, R. Seidel and M. Sharir, "Arrangements of Curves in the Plane–Topology, Combinatoris, and Algorithms", *Theoretical Computer Science 92* (1992), pp. 319–336.

M. Gangnet, J–C Hervé, T. Pudet and J–M Van Thong, "Incremental Computation of Planar Maps," *Computer Graphics (SIGGRAPH '89)*, vol. 23, No. 3, 1989, pp. 345–354.

Malik, Jitendra, "Interpreting line drawings of curved objects" *International Journal of Computer Vision*, vol. 1, No. 1, pp. 73–103, 1987.

P Vaxivière et al., "Celesstin: CAD Conversion of Mechanical Drawings," *IEEE Computer*, vol. 25, No. 7, Jul. 1992, pp. 46–54.

L. Boatto, et al., in "An Interpretation System for Land Register Maps," *IEEE Computer*, vol. 25, No. 7, Jul. 1992, pp. 25–33.

*Adobe Streamline 3.0 User's Manual*, Adobe Systems Incorporated, Oct. 1993, Chapters 1, 2, 4, and 5, and p. 62.

M. Garland and P. Heckbert, "Fast Polygonal Approximation of Terrains and Height Fields," *CMU Technical Report No. CMU–CS–95–181*, Carnegie Mellon University, Pittsburg, PA, Sep., 1995.

L. de Floriani and E. Puppo, "Hierarchical Triangulation for Multiresolution Surface Description," *ACM Transactions on Graphics*, vol. 14, No. 4, Oct. 1995, pp. 363–411.

Paul J. Besl and Ramesh C. Jain, "Segmentation Through Variable–Order Surface Fitting," in *IEEE Transactions on Pattern Analysis and Machine Intelligence*, vol. 10, No. 2, pp. 167–192, 1988.

M. Kocher and M. Kunt, "Image data compression by contour texture modeling" in *Applications of Digital Image Processing*, Andre Oosterlink, Andrew G. Tescher, Eds., Proceedings of the SPIE, 1983, pp. 132–139.

Nahred, A., and Peroche, B., "A 21/2–D hierarchical model based on planar maps", *Computer & Graphics*, vol. 20, No. 1, Jan./Feb. 1996, pp. 115–123.

USER-DIRECTED INTERACTION WITH AN IMAGE STRUCTURE MAP REPRESENTATION OF AN IMAGE

Cross Reference to Other Applications

The present invention is related to an invention that is the subject matter of a concurrently filed, commonly assigned U.S. patent application having the serial number and title: Ser. No. 08/581,669 "Dynamic Computation of a Line Segment Arrangement Using Finite Precision Arithmetic," which is hereby incorporated by reference herein as if set out in full.

BACKGROUND OF THE INVENTION

The present invention relates generally to a processor-based technique in the field of image understanding and representation, and more particularly, to an image interaction system that includes a data structure representation of an original image that captures geometric and topological information about regions in the image and efficiently and accurately spatially indexes those regions to permit a user to directly interact with both the original image and a version of the original image rendered from the data structure.

An image is a powerful medium of communication; it communicates information to a human viewer about objects, their spatial relationships (i.e., geometric and topological relationships), and the colors of their surfaces that the viewer is able to quickly and accurately recognize and understand. To do this, a human viewer of an image must be able to compute geometric and topological information from the image robustly and efficiently.

The power of images as communication tools has motivated the development of interactive image applications that provide for creating, retouching and manipulating full color images; such applications typically offer sophisticated tools for making selections of image areas, adjusting color and creating complex effects. An example of such an application is Adobe Photoshop™ available from Adobe Systems Incorporated, of Mountain View, Calif.. This application provides, among other capabilities, certain selection tools for selecting parts of a displayed input image in a variety of ways and with a range of precision. The marquee selection tools permit selection of rectangular and elliptical areas of a displayed image. A magic wand selection tool allows selection of a portion of a displayed image based on the color similarities of adjacent pixels. Options associated with each tool modify and extend the tool's selection properties.

Another example of an interactive image application, Colorize 2.0™ available from DS Design Inc. of Cary, N.C., permits a user to color a displayed black and white image. The user scans an original black and white image to create an original image data file, and then opens the application with this scanned original image data file as input; the application displays the black and white image in the display area of a display device, and the user is then able to apply color to areas of the image using brush and paint-to-edge tools. The application has the capability to keep color within broken lines; the user does not need to insure that an image region is closed before color is added to the region. The application includes an Erase Fragment tool, which uses an edge detection capability to permit a user to erase a particular shape in the displayed image.

The widespread use of images in computer-implemented applications has also motivated efforts to develop efficient and robust data structure representations of images that are able to capture geometric and topological information about the structures in an image. Such representations typically depend on some type of segmentation of an input image into meaningful or useful image areas; for a color image, these are typically areas of constant color. G. Koepfler, C. Lopez and J. M. Morel, in "A Multiscale Algorithm for Image Segmentation by Variational Method," Journal of Numerical Analysis of the Society of Industrial and Applied Mathematics, Vol. 31, No. 1, February 1994, pp. 282–299, disclose a fast and universal image segmentation algorithm that produces a hierarchy of image segmentations from fine to coarse scales. The algorithm computes a segmentation that is a partition of a rectangular image domain into a finite set of regions, each of which corresponds to a part of the image where a function g of the image is as constant as possible; the algorithm explicitly computes the region boundaries.

Existing image interaction applications typically do not provide the degree of robust and efficient computation of geometric and topological information about an image that is comparable to the capabilities of a human viewer of the image. Image interaction tools provided with applications such as Adobe Photoshop™, for example, are typically implemented as pixel-based operations; that is, the tools operate directly on a data structure that does not explicitly represent any structural information about the objects in the image, their spatial relationships, or their colors or textures. This approach shifts the entire burden of computing the geometric and topological information in an image from the computer application to the human user, who must visually interpret the image and make object selections with the degree of precision required for the purpose.

An image interaction application may be capable of computing and representing the geometric and topological information in an image that is necessary to permit a user to interact with the image with less detailed and precise instructions. However, image segmentation is a complex problem, and applications that depend exclusively on automatic image segmentation techniques to interpret geometric and topological information in an image very often are not capable of segmenting the image in reliable and accurate ways, or the segmentation produced is at a level of detail that is inappropriate for a particular use contemplated by the user of the application. An image interaction tool that relies on an exclusively automatic image segmentation approach effectively precludes the human user from employing unique human visual and computational skills to add to, enhance, or correct an automatically produced segmentation of an image.

SUMMARY OF THE INVENTION

The present invention is based on two fundamental premises. The first is that an image interaction application, to be truly useful to a user, should perform the primary computational tasks necessary to represent the geometric and topological information in an image in an efficient and accurate data structure representation in order to reduce the need for the user to interact with the image in detailed and precise ways. The second premise is that an image interaction application should be flexible enough to permit the user who intends to interact with the image to use perceptual skills to augment, enhance, or revise the data structure representation of the image produced by an automatic image segmentation operation in the application.

The present invention is also based on the observation that, in order for an image interaction application to meet these requirements, a data structure representation for an image must support the computation of the spatial relationships of regions in the image and their signal properties. The computation of this data structure should meet four goals: computing the representation from an image must be efficient; the representation must be compact; computing the information from the representation must be efficient; and the information computed from the representation must be accurate.

The present invention is based on the discovery of a data structure representation of an image called an image structure map that accurately and explicitly represents the geometric and topological properties of an image and allows for efficient and accurate spatial indexing of regions of an image. These features of the image structure map permit user interaction with the structures (e.g., objects, regions, surfaces) in an original image through either the original image or through an image rendered from the image structure map data structure.

The present invention achieves the four goals mentioned above. Computing the image structure map representation from an image is efficient because the image structure map is dynamically produced using a dynamic, incremental planar partition operation that partitions the image into regions according to a function of a smoothly varying property of the region using input image region boundary data that may be a combination of automatic image segmentation input and user-supplied image segmentation input. The incremental nature of the operation that produces the image structure map means that the partition of the image into regions is built by adding one region boundary at a time into the data structure; the dynamic nature of the operation that produces the image structure map means that the partition of the image is built without a priori knowledge of all the region boundary data items that are eventually to be included in the partition, and that both the region structures as well as the signal property descriptors for the regions can be altered or edited at any time.

Image interaction using the image structure map is efficient because the organization of the structures of the image in the image structure map facilitates efficient spatially indexing of the original image, thereby providing fast computation of original image information (e.g., point location) from the image structure map representation. In an illustrated embodiment of the invention, efficient spatial indexing is facilitated by using a special type of partition of the image known as a trapezoidal decomposition.

Image information computed from the image structure map representation, such as the locations of structures and their geometric and topological relationships to other structures, is accurate because the operation that builds the partition of the image insures that intersections and endpoints of image region boundaries have locations specified in machine representable numbers that are computed in a certain manner. Two important operations are needed to accomplish this: First, locations of the intersections and the endpoints of input region boundaries are rounded to representable points using a mathematically rigorous rounding operation. The rounding operation perturbs all vertices of the image partition to lie on representable points on an integer grid. One consequence of this perturbing is the breaking up of an original image boundary into pieces, called fragments. In order to ensure that the perturbed partition has a topology consistent with the original image, additional points on image boundaries in the partition are perturbed to the grid as well; the rounding operation specifies which points these are and to which representable points they should be perturbed. In the end, all vertices, edges, and faces of the resulting perturbed partition have exact representations with finite arithmetic. Secondly, the original locations of the input region boundaries provided by a user or by an automatic image segmentation operation are stored in the image structure map to ensure that the rounded image region boundaries are topologically consistent with the original input region boundaries. The process of rounding image structures so as to make all of their features exactly representable in finite arithmetic, in a dynamic environment, raises many algorithmic issues which the present invention successfully resolves.

The image structure map representation is compact in comparison with an original image data structure in the sense that the image structure map represents a smoothly varying signal property in each image region in a very compact form, thus eliminating much redundancy in the image signal. When an image is characterized by having homogeneous regions with sharp boundaries, such as a full color image, an image structure map representation represents the color for an entire region of pixel locations with a single value or with a matrix of parameters. The advantages of a compact image representation are achieved without significant loss of image information content; because the image structure map makes the geometric and topological structure of an image explicit, an image rendered from the image structure map still conveys substantial information about the objects in the original image, their spatial relationships to each other, and the signal properties of their regions.

The present invention is based on the further discovery that the image structure map may serve as the basis for a novel image interaction system in which a user interacts with a rendered view of an original image that is produced from the image structure map data structure. The rendered view of the original image represents the geometry and topology of the original image as captured in the image structure map. In the image interaction system of the present invention, a user may interact with the rendered view to make alterations to, or to query, the structures (e.g., the regions and region boundaries) in the rendered image. The user may also update the image structure map by interacting directly with a displayed view of the original image. The user may further invoke automatic operations on the original image data structure that produce region data, such as signal property descriptors and boundary data, that may be used to update the image structure map. An image interaction system organized in this manner takes full advantage of automatic computation methods to capture the geometric and topological properties of an image while permitting a user to employ human perceptual skills to augment the automatic operations. This combination of system elements provides much more powerful interaction with an original image than merely through the pixel data of the image.

Therefore, in accordance with the present invention, there is provided a method, implemented in a machine having a processor, for interacting with an image structure map data structure representing an original image in response to input interaction signals received from a user. The machine the method operates includes image input circuitry for receiving image definition data defining the original input image, and input signal circuitry for receiving interaction signals from a user interaction device. The machine also includes output circuitry connected to a display device for presenting images thereon. The machine further includes memory for storing data, and a processor connected for accessing instruction data stored in the memory for operating the machine. The processor is further connected for receiving the original image from the image input circuitry, connected for receiving the input interactions signals from the user interaction device, and connected for providing image definition data defining images to the output circuitry for presenting the images on the display device. The method comprises receiving an image interaction signal from the input circuitry indicating an image interaction request from a user to modify an image structure map data structure, referred to as an image structure map, that spatially indexes a displayed original image. The displayed original image represents an original image data structure, referred to as an original image, having image locations therein specified according to a first coordinate system. The image interaction signal includes an image location in the original image indicated by coordinates in the first coordinate system and an image interaction request.

The method further comprises modifying the image structure map data structure according to the image interaction request, in response to the input interaction signal, using the image location in the original image indicated by coordinates in the first coordinate system. The image structure map indicates a partition of a 2D plane induced by a set of image boundary data items into one or more image regions included in the original image. Each vertex location included in the image structure map (the endpoints and intersections of the image boundary data items) is specified as a machine representable number computed according to a rounding operation that ensures that the partition of the original image as represented by the image structure map is topologically consistent with the partition of the original image as represented by the unrounded image boundaries therein. The image structure map includes, for each image region in the original image, a region data item indicating a location of the image region in the original image and a signal property descriptor. The signal property descriptor has a value indicating a smoothly varying function of the signals included in locations in the original image determined to be included in the image region of the original image.

Modifying the image structure map data structure according to the image interaction request includes determining an image structure map location of an image structure in the image structure map using the image location in the original image, and modifying the image structure in the image structure map according to the image interaction request.

The novel features that are considered characteristic of the present invention are particularly and specifically set forth in the appended claims. The invention itself, however, both as to its organization and method of operation, together with its advantages, will best be understood from the following description of the illustrated embodiments when read in connection with the accompanying drawings. In the Figures, the same numbers have been used to denote the same component parts or steps.

Figure 1:
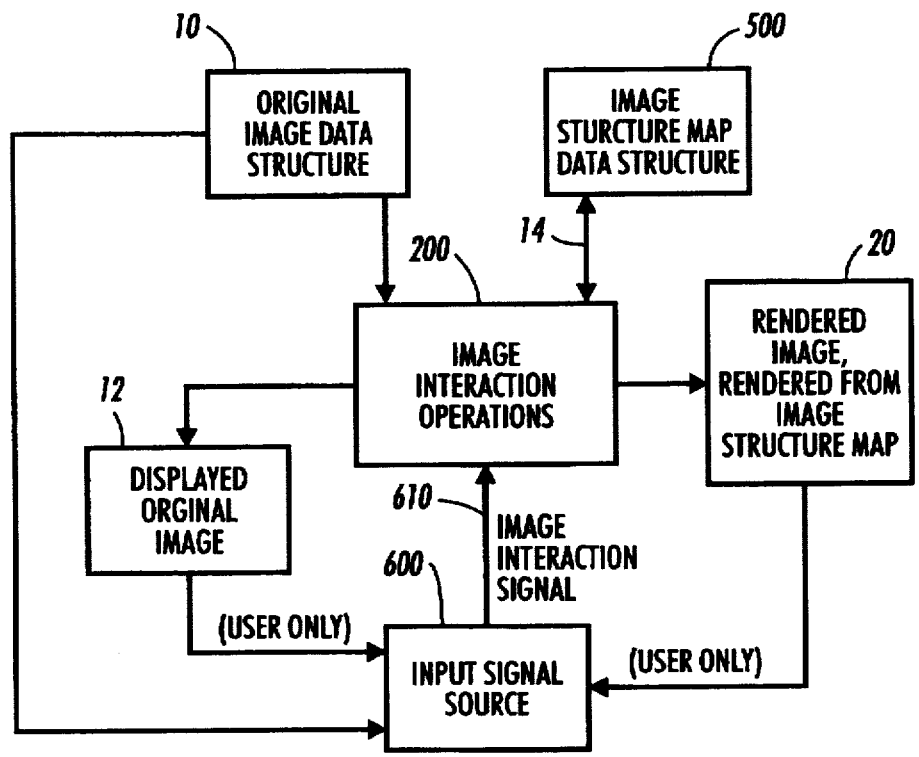
FIG. 1 is a high level block diagram of the image interaction system of the present invention showing as input, an input signal source, and showing the processing flow between image interaction operations and each of the displayed images and stored data structures of the present invention.

DETAILED DESCRIPTION OF THE
ILLUSTRATED EMBODIMENTS

The detailed description below is organized as follows: Section A provides a conceptual framework for understanding the invention and the terminology used to describe the invention. Section B describes the general features of the present invention, including a general description of the image structure map data structure. Section C provides a procedural description of an illustrated embodiment of the present invention, including a description of an implemented embodiment of the image structure map data structure. Section D provides a description of the machine environment of the present invention and a description of the invention implemented as a software product.

A. Conceptual Framework.

The present invention relates to operating a machine or system including a processor, and to processing electrical or other physical signals to produce other desired physical signals. The detailed descriptions which follow are presented largely in terms of symbolic representations of operations of data within the memory of the system. These operations require physical manipulations of physical quantities such as electrical or magnetic signals that are capable of being stored, transferred, combined, compared, and otherwise manipulated. For convenience, these physical signals will be referred to herein variously as bits, values, image locations, or pixels. Further, the operations performed on the signals, referred to in terms such as adding, comparing, locating or determining, while commonly associated with mental operations performed by a human user, are performed exclusively by a processor of a suitable machine, and require no human capability, apart from supplying, when appropriate, input interaction signals. In addition, the algorithmic descriptions of the invention that are presented herein for operating the system are not inherently related to any particular processor, machine, or other apparatus. The machine or system may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiments of the claimed invention illustrated in the accompanying drawings. These terms have the meanings indicated below throughout this specification and in the claims, rather than any meanings that may occur in other sources, such as, for example, documents, if any, that are incorporated by reference herein elsewhere in this description.

The term "data" or "data item" refers herein to physical signals that indicate or include information. "Data" includes data existing in any physical form, and includes data that is transitory or is being stored or transmitted. For example, data could exist as an electromagnetic or other transmitted signal or as a signal stored in electronic, magnetic, or other form. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, a region data item 502 in FIG. 5 indicates a region boundary data item 508. When an item of data can indicate one of a number of possible alternatives, the item of data has one of a number of "values." For example, region signal property descriptor 504 in FIG. 5 indicates a value of the signal property for the region pointing to the descriptor. Thus, when the signal property of a region is its color, region signal property descriptor 504 indicates a color value for the region. An item of data "includes" information indicating a thing, an event, or a characteristic if data indicating the thing, event, or characteristic can be obtained by operating on the item of data.

A "processor" is any machine, component or system that can process data, and may include one or more central processing units or other processing components. Any two components of a machine or system are "connected" when there is a combination of circuitry that can transfer data from one of the components to the other. A processor "uses" data in performing an operation when the result of the operation depends on the value of the data. An "instruction" is an item of data that a processor can use to determine its own operation. A processor executes a set of instructions when it uses the instructions to determine its operation, and an "operation" results from the processor executing the set of instructions. Thus, a set of instructions may be considered to be an operation. To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data.

"Memory" is any component, combination of components, circuitry, or system that can store data, and may include local and remote memory and input/output devices. A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data. An example of memory is a storage medium access device with a data storage medium that it can access.

An "image" is a pattern of light. Data "defines" an image when the data includes sufficient information to produce the image, such as by presenting it on a display. An "image definition data structure" or "image data structure" includes data indicating a one-to-n dimensional signal sampled from an image in a two-dimensional (2D) domain in a regular fashion. The signal may indicate, for example, a color, a grayscale value, multispectral values, or range data. The term "original image" to refers to the image definition data structure defining an image that is an input image to the present invention.

An "image output device" is a device that can provide output defining an image. A "display" or "display device" is an image output device that is capable of presenting information in human perceptible form. A display may, for example, include a cathode ray tube; an array of light emitting, reflecting, or absorbing elements; a device or structure that presents marks on paper or another medium; or any other device or structure capable of defining an image in a perceptible form. A "display area" is the portion of the display in which an image is presented or the medium which receives an image. A processor "presents" an image on a display when the processor produces image definition data defining the image and provides the image definition data to output circuitry connected to the display for display in the display area so that the image is perceptible to a machine user.

"Input signal circuitry" is circuitry for providing input signals to the processor from an input signal source. The input signal source may be directed by a human user or by an automatic operation under the control of a processor. "User input circuitry" is circuitry for providing signals based on actions of a user. User input circuitry can receive signals from one or more "user input devices" that provide signals based on actions of a user, such as a keyboard, a mouse, or stylus device. The set of signals provided by user input circuitry can therefore include data indicating mouse operations, keyboard operations and stylus operations. Signals from user input circuitry may include a "request" for an operation, in which case a system may perform the requested operation in response to the receiving the request. An action by a user "indicates" a thing, an event, or a characteristic when the action demonstrates or points out the thing, event or characteristic in a manner that is distinguishable from actions that do not indicate the thing, event, or characteristic. For example, a signal from a user input device indicates a position in an image if the signal includes data from which the position can be uniquely identified. Similarly, a user signal may include a request to initiate or invoke an operation and information identifying the requested operation, when the signals received are for indicating a valid request for a valid operation and for causing the operation to be performed.

An "image region data item" or "region" is an area of an image data structure in which some property of the image signals in the area is smoothly varying over the area. A "signal property descriptor" is a data item that indicates the value of the smoothly varying property of the region.

An "image region boundary data item" or "region boundary" indicates an area of an image data structure between two regions. Examples of image region boundaries are curves and line segments. By definition herein, a region does not include its region boundaries. A "vertex" is a region boundary endpoint or an intersection between two region boundaries. A region boundary is "adjacent to" a given region when the region boundary is a region boundary of that region; a vertex is adjacent to a region or to a region boundary if the vertex is contained in the region boundary.

A "partition data structure" includes data indicating the vertices, region boundaries and regions of an original image, the vertices adjacent to each region boundary, and the region boundaries and vertices adjacent to each region. A partition data structure will also be referred to as simply a "partition." A partition of an original image indicates data describing both the geometric and the topological properties of the set of region boundaries determined to be included in the image. The geometric properties include the positions of the region boundaries determined to be included in the image, typically specified by their endpoints, and the geometric definition of the region boundaries; the topological information indicates the incidence and adjacency of the vertices, region boundaries and regions that comprise the partition. A process, operation or algorithm is said to "produce" or "build" a partition. The partition produced for a given original image is a function of the region boundaries provided as input to the partition building process; thus, an original image may be represented by different partitions, and there is no single unique partition for a given original image. A partition of a whole or part of the original image into image regions is said to be "induced" by a given set of region boundaries.

An "image structure map data structure" or "image structure map" is a data structure that includes a partition of an original image into image regions and, for each image region, includes a signal property descriptor. An "image structure" refers to a region, a region boundary or a vertex included in an image structure map data structure. An image structure map is said to be "for" an original image or is said to "represent" an original image when the image structure map indicates a partition of the original image. An image structure map "spatially indexes" an image definition data structure when an image location in the image definition data structure specified in a first coordinate system in a two-dimensional (2D) plane is able to be mapped to the of an image structure in the image structure map specified in the coordinate system of the image structure map in the two-dimensional (2D) plane. When the image definition data structure is presented as a displayed image in the display area of a display device, image locations in the displayed image specified in a coordinate system related to the display device are able to be transformed to the first coordinate system of the image definition data structure using known methods. It follows from this that an image structure map for the image definition data structure spatially indexes the displayed image as well.

A "rounded partition of the original image" for a given input set of region boundaries has all of its vertices specified as machine representable points. Specifying vertices in this manner takes an input image region boundary and produces a "rounded region image boundary." Each vertex in a rounded partition is referred to as a "rounded vertex." An "unrounded partition of the original image" is a partition in which vertices are not guaranteed to be specified as machine representable points. An unrounded partition is also referred to herein as an "ideal partition of the original image." A rounded partition of an original image into image regions is "topologically consistent" with an ideal partition of the original image when each rounded vertex retains the same orientation with respect to any particular rounded region boundary as the corresponding ideal vertex has with respect to the corresponding input region boundary.

Figure 18:
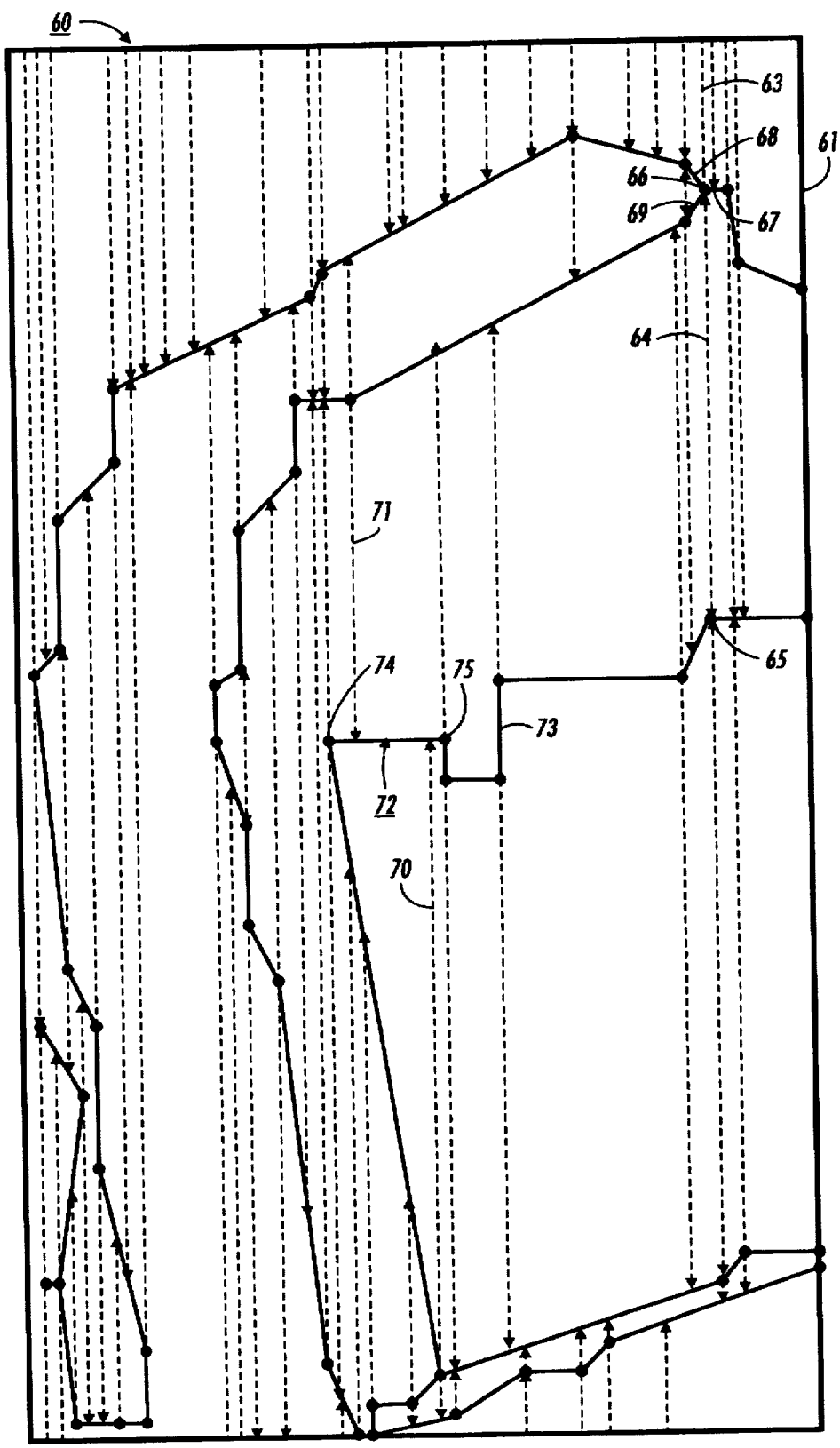
FIG. 18 is an image rendered from the image structure map data structure representation of the image of FIG. 6, for the portion shown in FIG. 7, and showing the vertical cell decomposition for the image portion shown in FIG. 7, produced according to the illustrated embodiment of the present invention.

A "vertical trapezoidal decomposition of an original image" is a partition of the original image in which the regions are subdivided into one or more trapezoids having either two parallel vertical sides or at least one vertical side and a vertex. A vertical trapezoidal decomposition is also referred to as a "vertical cell decomposition" or "VCD." FIG. 18 shows rendered image 60 which presents a visual representation of the vertical cell decomposition of portion 4 of original image 2 shown in FIG. 7. In FIG. 18, a vertex is represented by a filled circle, a region boundary with a solid line, and a vertical attachment by a dashed line with an arrow that points to the region boundary at one end of the attachment. The addition of vertical attachments to a partition of an image partition produces cells that are all trapezoids, generally with two vertical sides and allowing for degenerate cells such as triangles.

A vertical trapezoidal decomposition is an example of a larger category of partitions of an original image in which the regions are subdivided into areas, referred to as cells, having some standardized geometric shape, such that a data structure describing a cell requires a fixed amount of memory space. The image structure map of the present invention may include a partition of the original image in which regions are subdivided into cells that are all of a standardized geometric shape, such as a vertical cell decomposition, as well as a partition of the original image in which regions have irregular shapes.

Figure 8:
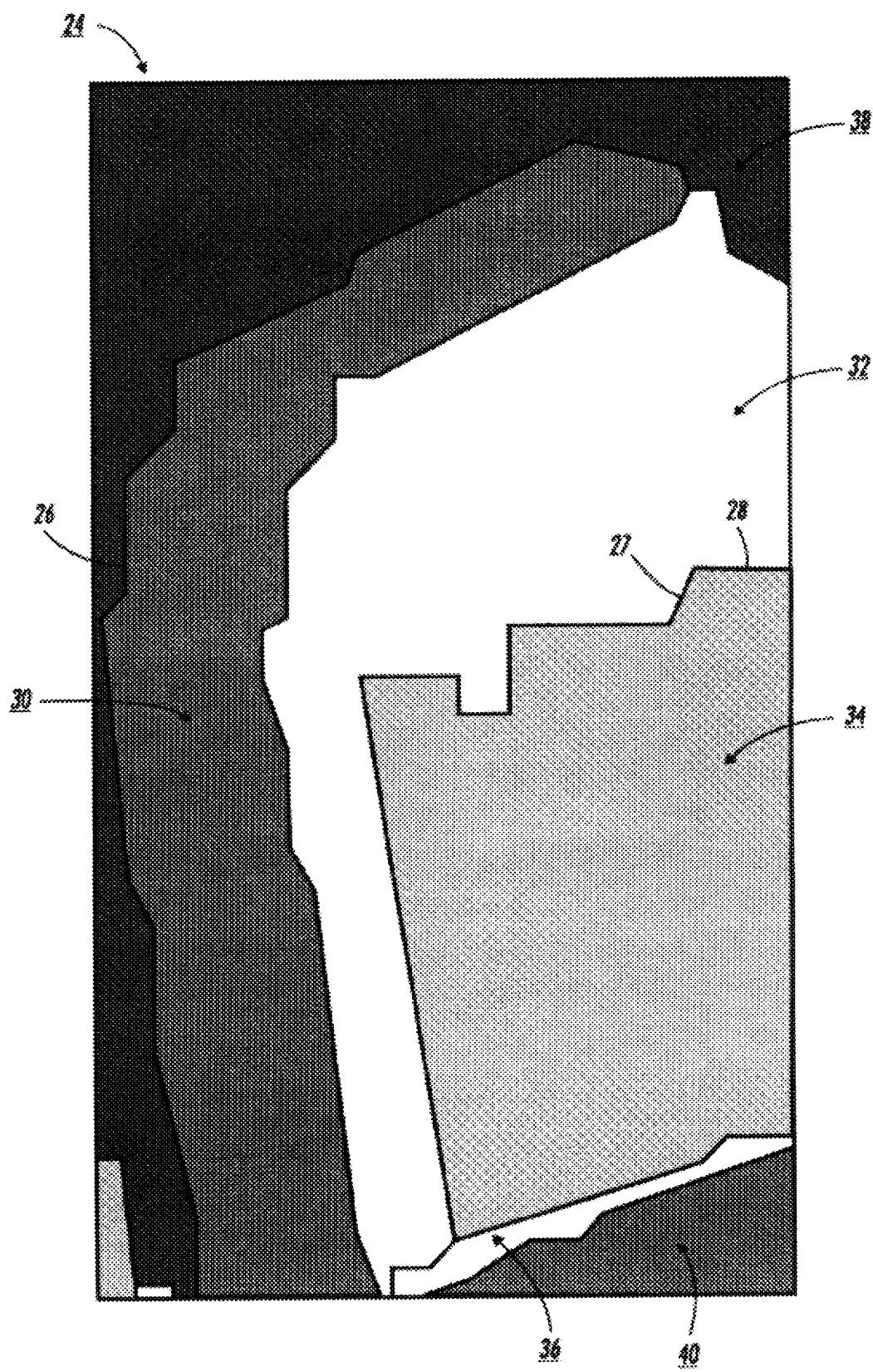
FIG. 8 illustrates an image rendered from the image structure map data structure representation of the image of FIG. 6, for the portion shown in FIG. 7, and showing regions, region boundaries and visual representations of signal property descriptors.

The term "display feature" refers to any human perception produced by a display device, and includes a single display feature and also may include plural display features that together form a pattern of display features in an image. A "display object" is a display feature that is perceptible as a coherent unity. An image "includes" a display feature or display object if presentation of the image can produce perception of the display feature or display object. A common characteristic of processor-controlled machines that display images is a mapping between items of data within the memory of the machine and display features included in the image presented by the processor. A display feature "represents" a data item or a body of data when the display feature can be mapped to the data item or to data items in the body of data. A display feature "represents" the item of data to which it can be mapped. An item of data "is represented by" a display feature to which it is mapped. A "rendered image" as used herein is an image produced using the image structure map of an original image; a "rendering operation" maps data items in the image structure map to display features or display objects in the rendered image. For example, display feature 28 in image 24 of FIG. 8 represents an image region boundary 508 in image structure map 500.

B. General Features of the Invention

1. An application-level block diagram of the image interaction system present invention.

FIG. 1 is a high level block diagram showing the image interaction system of the present invention. An original image is represented in machine memory as an original image definition data structure 10, hereafter also referred to as original image 10; original image 10 may be represented as displayed original image 12 when the image interactions system is to be used by a user who intends to interact with original image 10. Image structure map data structure 500 indicates the partition of original image 10 induced by a set of image region boundaries that are provided for original image 10; when the purpose of the interaction with original image 10 is to build the image structure map of original image 10, image structure map data structure 500 may be initially defined as having a single region with a default or empty signal property descriptor. Rendered image 20 is a displayed image that is produced by a rendering operation using data about original image 10 that is included in image structure map data structure 500. Thus, there are likely to be substantial visual similarities between rendered image 20 and displayed original image 12; the visual similarity between rendered image 20 and displayed original image 12 is a dependent on the level of detail and accuracy of the region and signal property descriptor data that is included in image structure map 500. Input signal source 600 provides image interaction signals 610 to an image interaction process 200. The source of these image interaction signals may include original image definition data structure 10, displayed original image 12 and rendered image 20, depending on the particular signal source providing interaction signal 610.

2. Overview of image interaction operations.

Image interaction process 200 is performed in response to receiving image interaction signal 610 from input signal source 600. Image interaction process 200 includes a number of operations that may be performed on image structure map 500. The upward pointing part of double arrow 14 indicates that image structure map 500 may be changed (updated) as a result of an operation performed by interaction process 200, in addition to providing data to process 200 (illustrated by the downward pointing part of double arrow 14). Original image definition data structure 10 also provides input data to certain operations included in interaction process 200.

Figure 2:
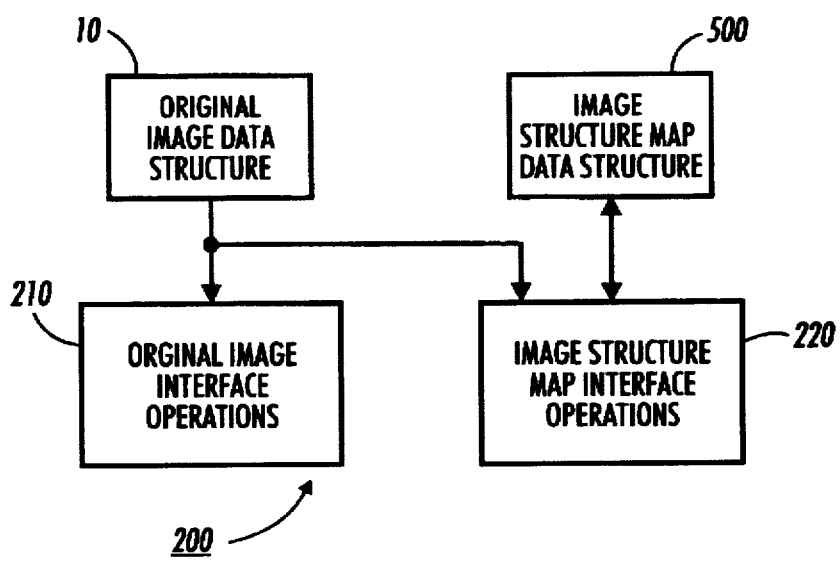
FIG. 2 is an expanded block diagram of block 200 of FIG. 1 showing image interaction operations consisting of original image and image structure map interface operations.
Figure 3:
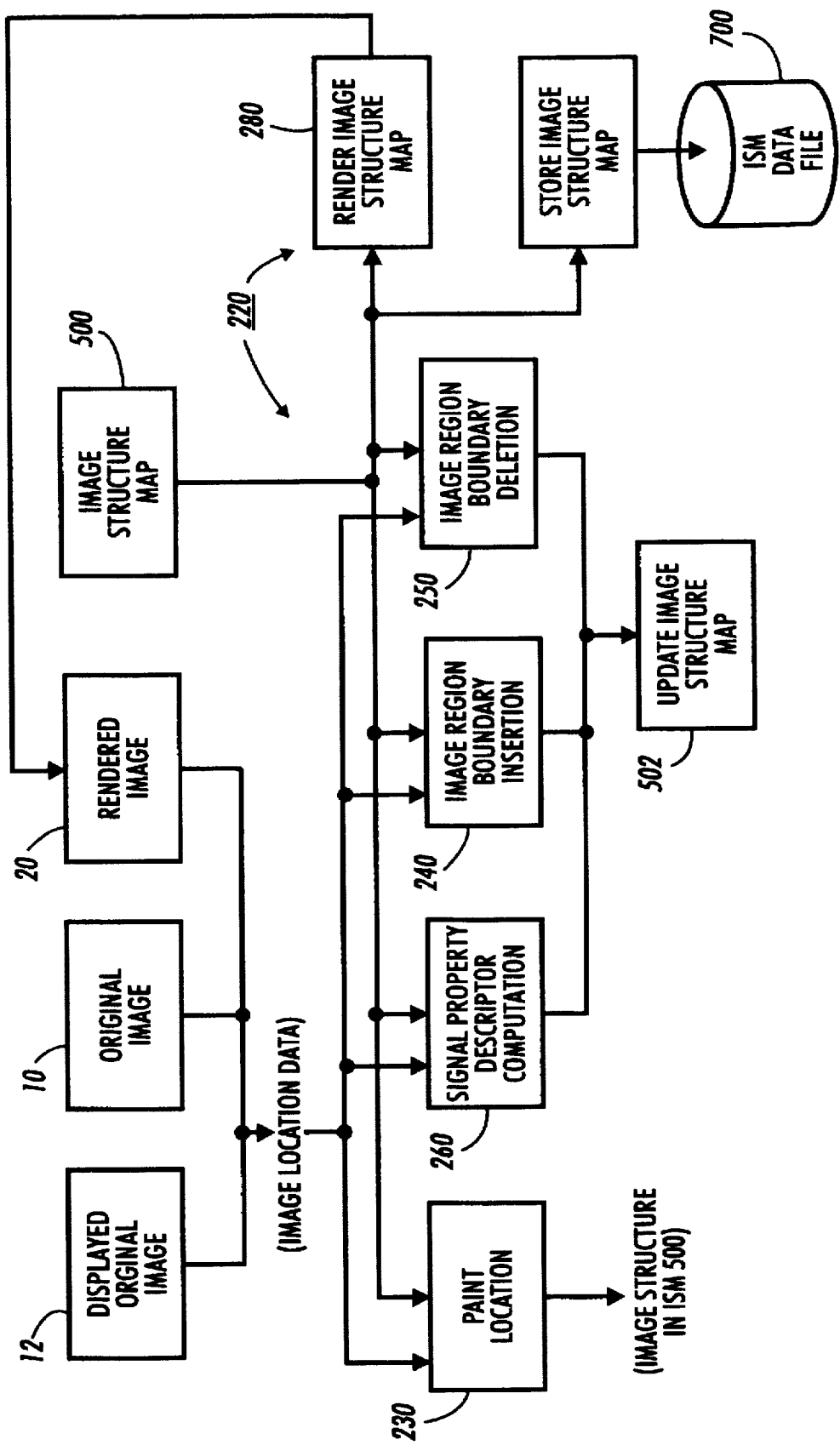
FIG. 3 is an expanded block diagram of block 220 of FIG. 2 showing the processing operations available for image interaction according to the present invention.
Figure 21:
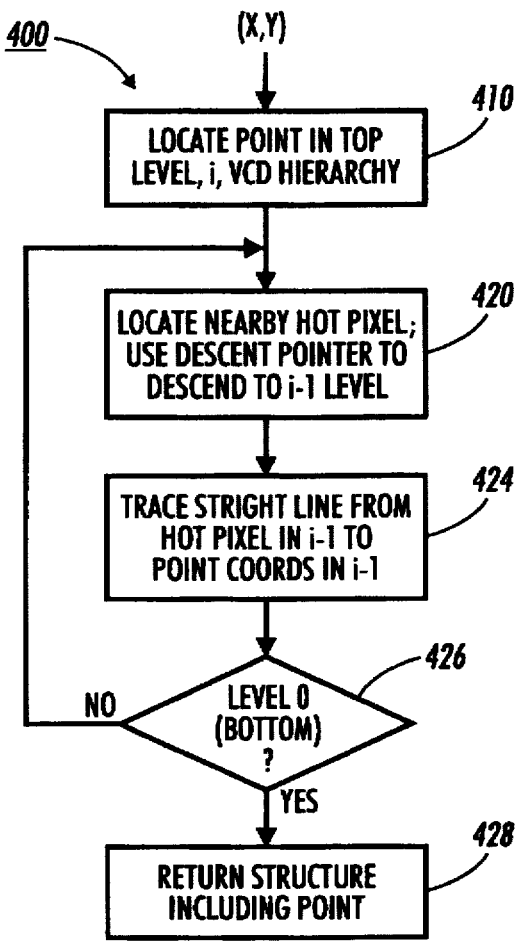
FIG. 21 is a flowchart showing the process for locating a point in the hierarchical image structure map data structure according to an illustrated embodiment of the present invention.
Figure 22:
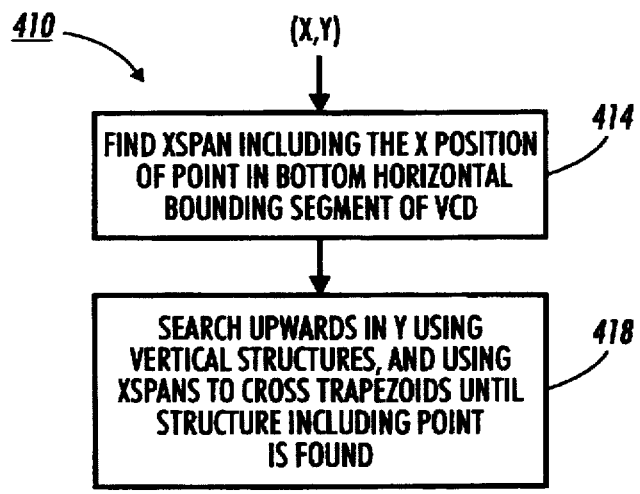
FIG. 22 is a flowchart illustrating point location in a single level of the image structure map data structure according to an illustrated embodiment of the present invention.

FIG. 2 illustrates two main components of image interaction process 200: original image interface operations 210 and image structure map interface operations 220. Interface operations 220 include the primitive operations needed to interact with image structure map 500 to provide the functionality provided by the image interactions system of the present invention. These are illustrated in FIG. 3, and include the following operations:

(1) a point location operation 230 that takes as input an image location either in displayed original image 12, original image 10 or rendered image 20, and returns an image structure in image structure map 500 that includes the input image location. An example of point location operation 230 is illustrated in FIGS. 21 and 22 in the context of an illustrated embodiment of the present invention.

Figure 23:
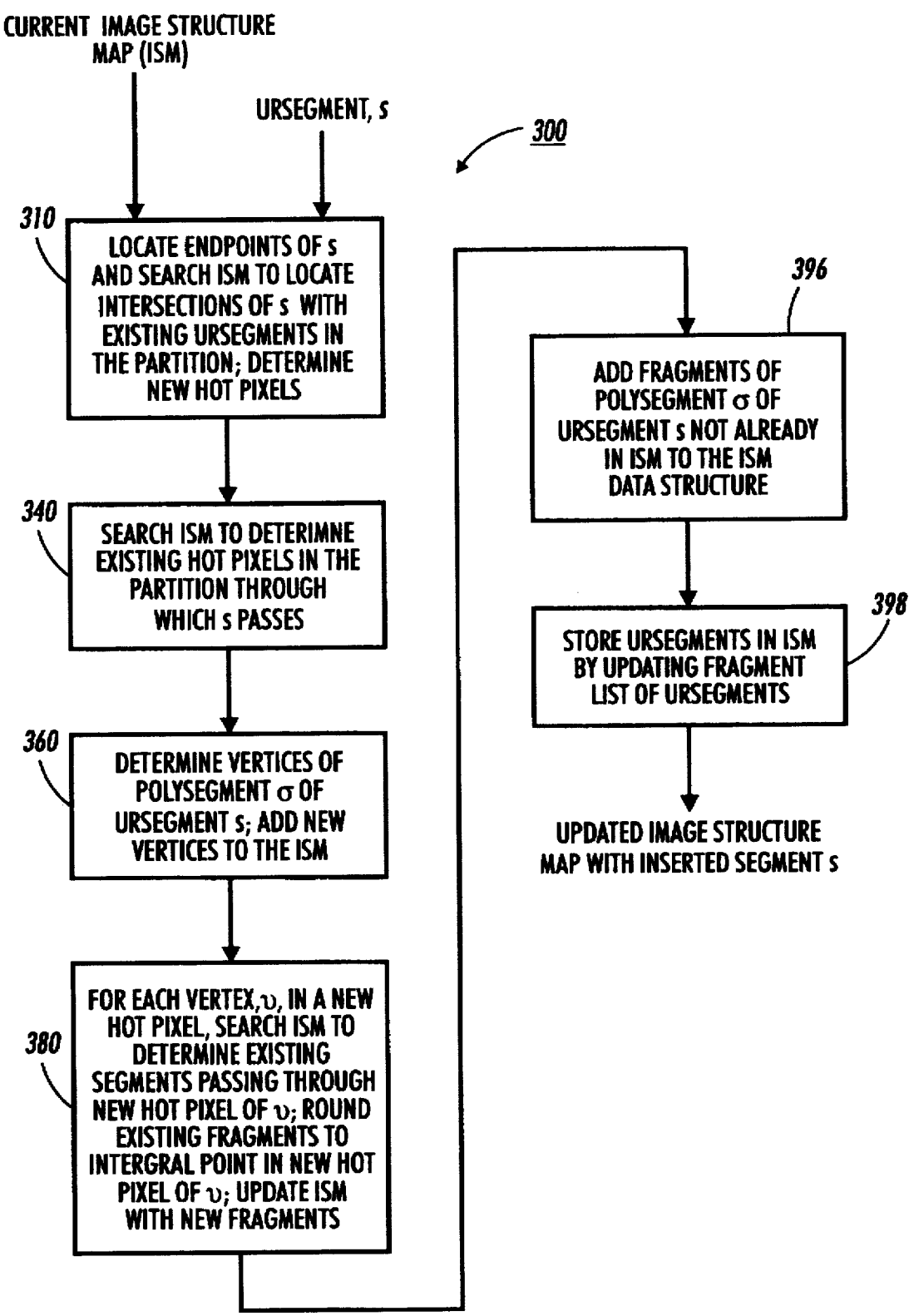
FIG. 23 is a flowchart illustrating the operation of inserting an image region boundary into the image structure map according to an illustrated embodiment of the present invention.

(2) a region boundary insertion operation 240 that takes as input image location data indicating an image region boundary and an insertion function signal, and returns an image structure map data structure that has been updated to include the image region boundary and its associated vertices and regions. An example of operation 240 is illustrated in FIG. 23 in the context of an illustrated embodiment of the present invention.

Figure 27:
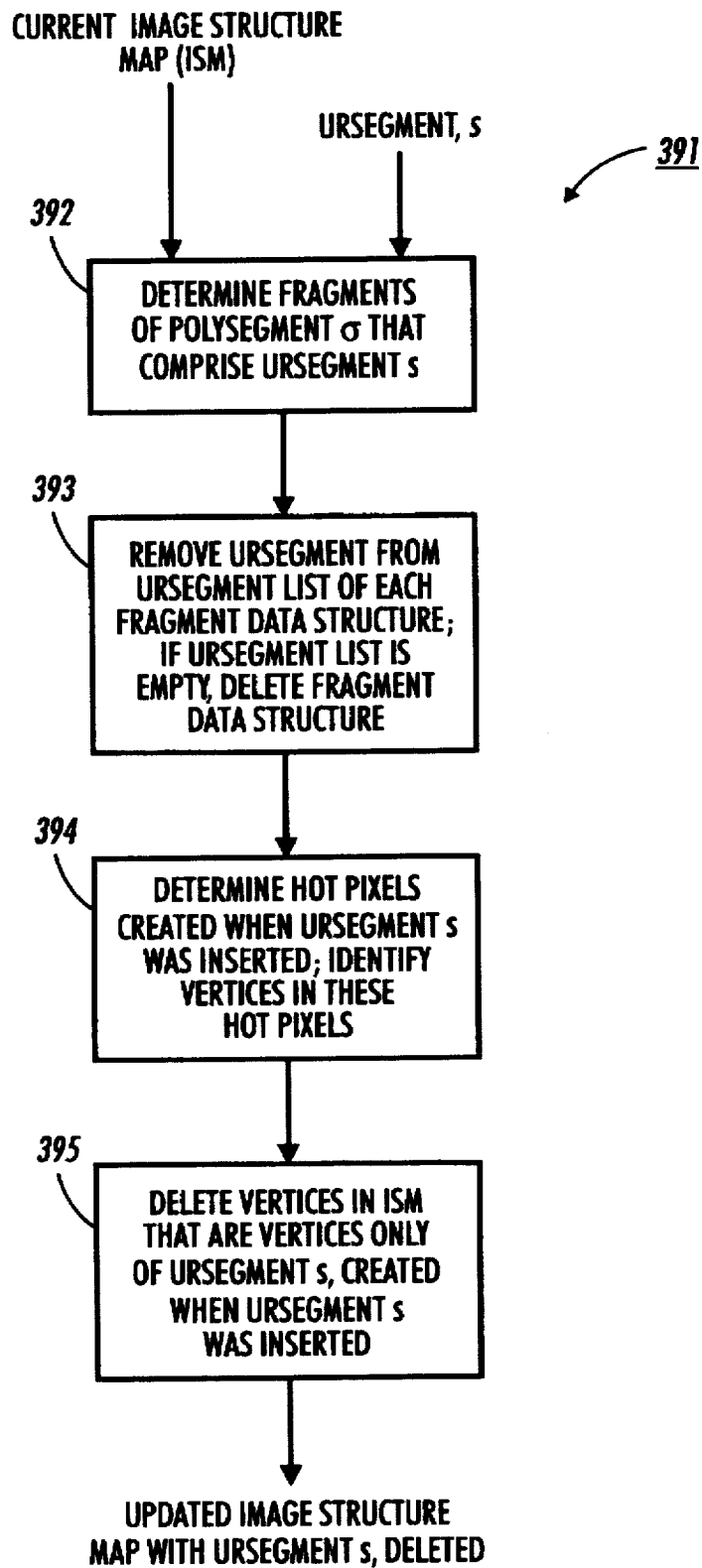
FIG. 27 is a flowchart showing the processing operations for deleting a line segment from the image structure map according to an illustrated implementation of the present invention.

(3) a region boundary deletion operation 250 that takes as input image location data indicating an image region boundary and a deletion function signal, and returns an image structure map data structure that has been updated to remove the image region boundary and associated vertices and regions that are only present in the image structure map as a result of the image region boundary that has been deleted. An example of operation 250 is illustrated in FIG. 27 in the context of an illustrated embodiment of the present invention.

(4) a signal property descriptor computation operation 260 that takes as input an image location either in displayed original image 12 or in rendered image 20 and signal property descriptor source data, and computes a signal property descriptor for the region in image structure map 500 that includes the input image location. Signal property descriptor source data may indicate a value for the signal property descriptor, in which case the signal property descriptor for the region specified by the input image location is updated to reflect this input value, or it may indicate a function that specifies how the signal property descriptor for the region is to be computed using source data from the original image. Operation 260 is described in more detail in the discussion below accompanying the flowchart of FIG. 12.

(5) a rendering operation 280 that takes as input image structure map 500 or a specified portion thereof, and produces data indicating rendered image 20 for presentation by a processor on a display device; and (6) a storing operation 290 that takes as input image structure map 500 or a specified portion thereof, and produces a data file 700 indicating image structure map 500 suitable for storing by a processor on a memory device.

These primitive operations also provide the basis for higher-level operations such as queries about data included in image structure map 500. For example, a system user may request information about the numbers or types of image structures adjacent to a given input image structure. Thus, higher level operations such as "output a list of or count of the image region boundaries at the vertex nearest this input image location" or "identify the regions that have a signal property descriptor equal to or within a certain range of an input signal property descriptor" are also supported. A system user may also request that a signal property descriptor in one or more regions be changed.

Original image interface operations 210 (FIG. 2) include the primitive operations needed to interact with original image definition data structure 10 to provide the functionality provided by the image interaction system of the present invention. These operations include getting a signal value at a given one or more image locations, and rendering original image 10 to produced displayed image 12. Note that original image definition data structure 10 is not modified in the image interaction system of the present invention.

3. Input signal sources.

Figure 4:
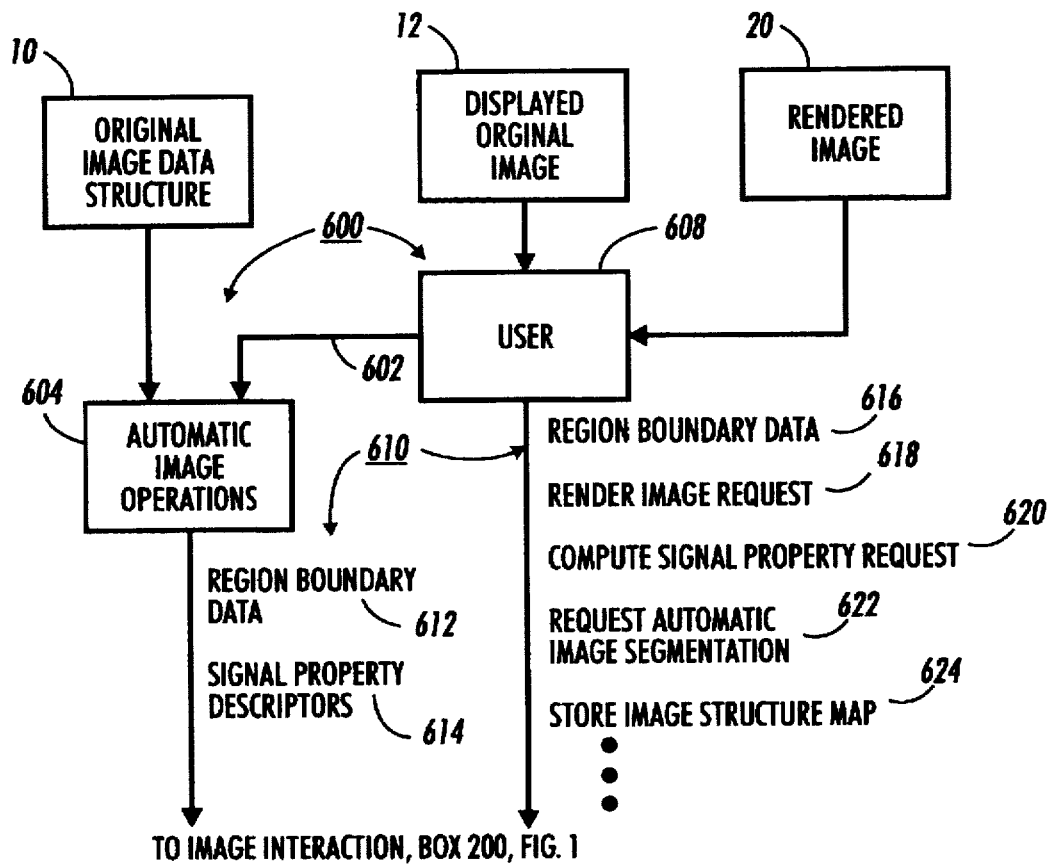
FIG. 4 is an expanded block diagram of the input signal source 600 of FIG. 1 showing two sources of image interaction signals for image interaction according to the present invention.

FIG. 4 is a high-level block diagram that expands on input signal source 600 of FIG. 1, and shows two input signal sources: a user 608 and automatic image operations 604. User 608 may use a user interaction device such as a pointing device (mouse,) writing or tracing device, such as a mouse or stylus, or a keyboard to produce input image interaction signals 610 of the type shown by way of example in FIG. 4. The user may produce these signals using displayed original image 12 or rendered image 20.

Automatic image operations 604 include any suitable type of image processing operations that may be performed using original image definition data structure 10 to produce image interaction signals 610 of the type used by interface operations 200; these typically include, but are not limited to, region boundary data 612 or signal property descriptor data 614. Suitable operations include an automatic image segmentation operation that identifies image region boundaries in original image 10.

User 608 may invoke or initiate automatic image operations 604, as shown by arrow 602 in order to generate image interaction signals. So, for example, a user may produce a first image structure map 500 for an original image 10 by invoking an automatic image segmentation operation that inserts region boundary data items into the data structure and computes a signal property descriptor for each region. Then the user may modify image structure map 500 by deleting or modifying region boundaries produced by the automatic image segmentation operation.

4. General features of image structure map data structure.

Figure 5:
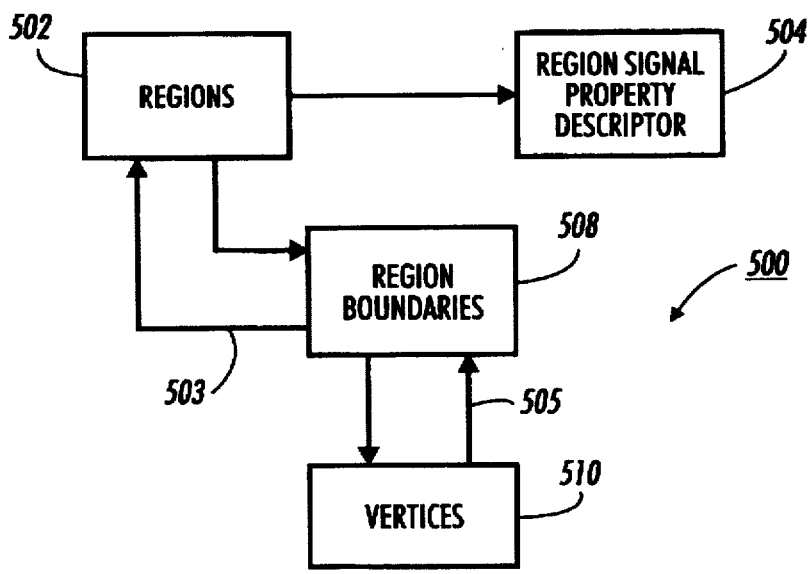
FIG. 5 is an expanded block diagram of the image structure map 500 of FIG. 1 showing the component data structures that comprise the image structure map data structure of the present invention.

FIG. 5 illustrates a general block diagram of the structure of image structure map data structure 500. At the top level of data structure 500, each region identified in original image 10 is represented by a region data structure 502 and indicates a region signal property descriptor 504. Each region 502 indicates the region boundaries adjacent to the region; each of these region boundaries is represented by a region boundary data structure 508, and each region boundary 508 also indicates the regions to which it is adjacent, shown by arrow 503 pointing from region boundary 508 back to region 502. Each region boundary 508 indicates the vertices adjacent to boundary 508; each of these vertices is represented by a vertex data structure 510, and each vertex also indicates the region boundaries to which it is adjacent, shown by arrow 505 pointing from vertex 510 back to region boundary 508.

The data that is explicitly included in each of these data structures is an implementation choice determined by the design of image structure map 500, and takes into account efficiency of access to the image structures in the data structure in comparison with the storage requirements of the data structure. It may be determined experimentally that explicitly representing certain data in the data structure that could otherwise be computed will result in faster access to image structures, and thus provide a more acceptable level of image interaction with displayed image 12 and rendered image 20 than could otherwise be achieved by computing the same information.

An important aspect of image structure map 500 is that it is dynamically produced; that is, region boundary data may be added to, or deleted from, image structure map 500 without needing to know all of the region boundary data items that are to be included in the data structure a priori. This requires that region boundary insertion operation 240 and region boundary deletion operation 250 of image structure map interface operations 220 (FIG. 3) be designed as dynamic operations.

5. Original and rendered images.

Figure 6:
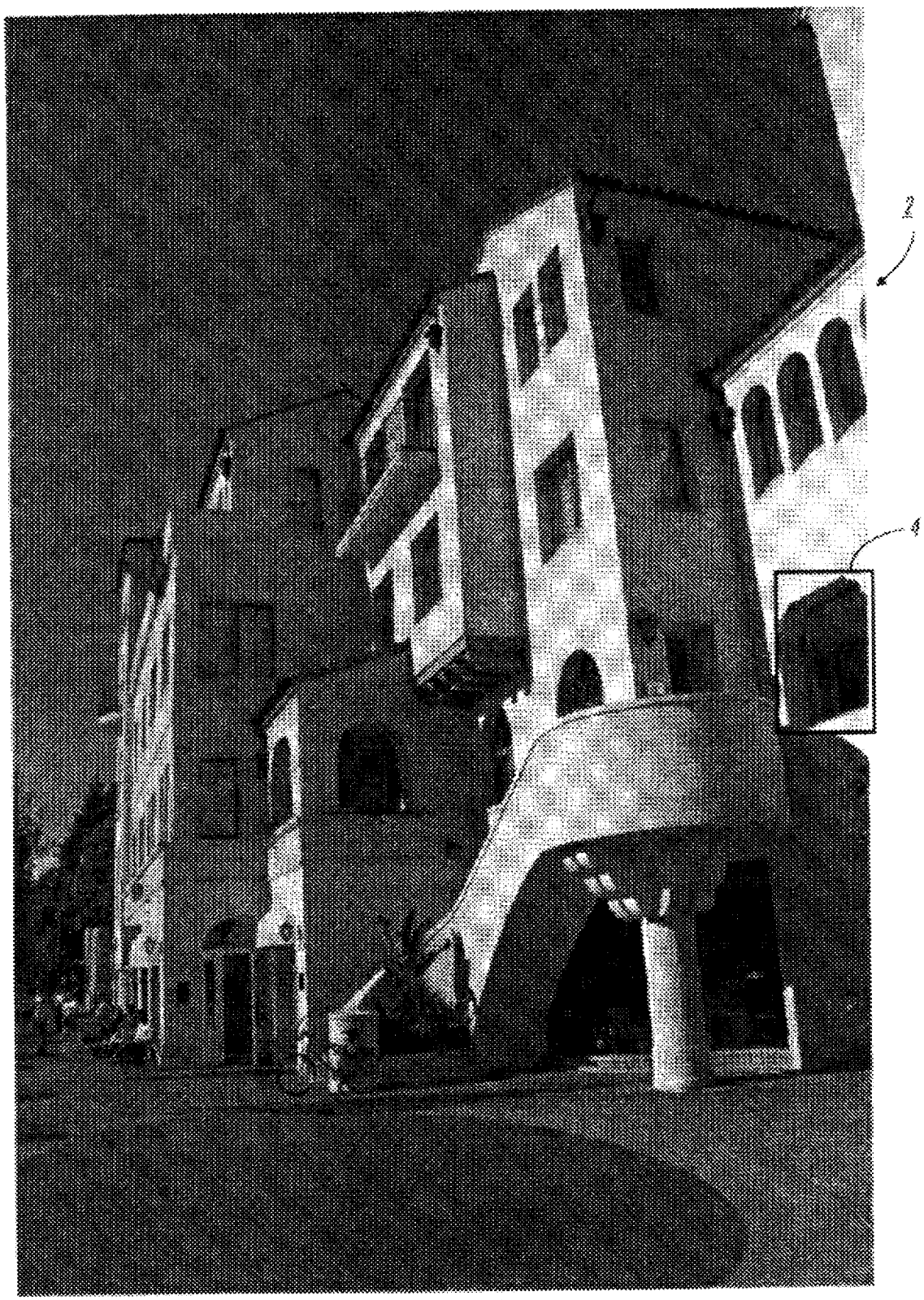
FIG. 6 illustrates an example of an original image that is suitable for use in the image interaction system of the present invention, and which may be represented as an image structure map according to the present invention.

The present invention accepts a wide variety of digital images as original image 10. FIG. 6 shows image 2 which is a continuous tone image; the image definition data structure of image 2 was produced by using a film scanner to scan a film negative image to produce a digital image data structure in Kodak® PhotoCD format which was then stored on an optical storage medium. Other types of original image data 10 include data from continuous-tone printed images captured by a scanning operation, or produced directly by a digital camera, or produced from hardware that digitizes image data from a video camera. Data indicating a synthetic, or computer-generated, image is also suitable as original image 10. Printed halftone images may also be suitable, provided that a suitable blurring function can be applied to the image signals to produce smoothly varying signals in image regions.

Original image 2 of FIG. 6 indicates what may be referred to as a photorealistic, or natural, scene. While the image interaction system of the present invention is particularly suited to interacting with natural images, the present invention is not limited to interacting only with such images. Images that indicate other types of subject matter, such as those containing graphical objects, may also be suitable. For example, maps, engineering drawings, architectural renderings, scientific illustrations, presentation and business graphics, and digitized artwork are all types of images suitable for being represented as image structure maps, and suitable for use in the image interaction system of the present invention.

Figure 7:
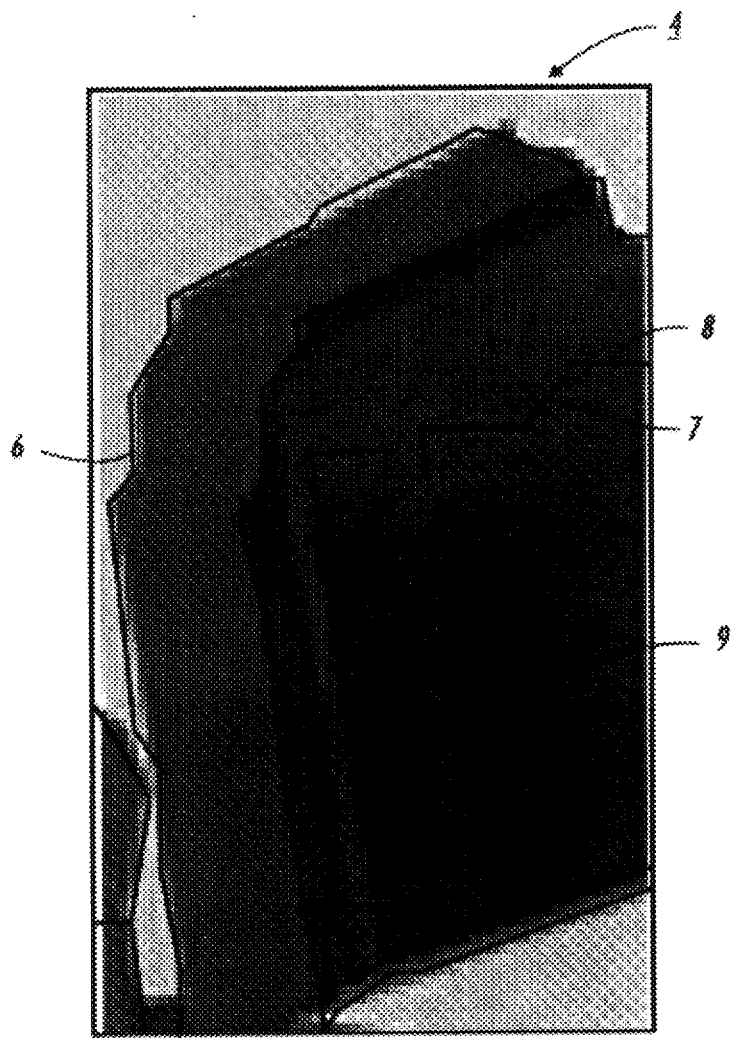
FIG. 7 illustrates a portion of the image of FIG. 6 that is used to illustrate features of the present invention.

FIG. 7 shows enlarged portion 4 of original image 2 of FIG. 6, the arched opening in the building in image 2, at the far right side. FIG. 8 shows rendered image 24, which is rendered from an image structure map data structure produced for original image 2, and which shows only the portion of the image structure map data structure that corresponds to original image portion 4. FIG. 8 shows several image regions, including regions 30, 32, 34, and 36. Rendered image 24 also shows portions of regions 38 and 40 which may have boundaries beyond the extent of rendered image 24 in FIG. 8. Regions 30, 32, 34, and 36 are shown with visible region boundaries, the thin line segments visible between the regions. For example, line segments 26, 27 and 28 are region boundaries. Rendered image 24 also shows regions 30, 32, 34, and 36 each having an interior region color, shown as a shade of gray in the figure, which indicates the signal property descriptor of the region.

Figure 9:
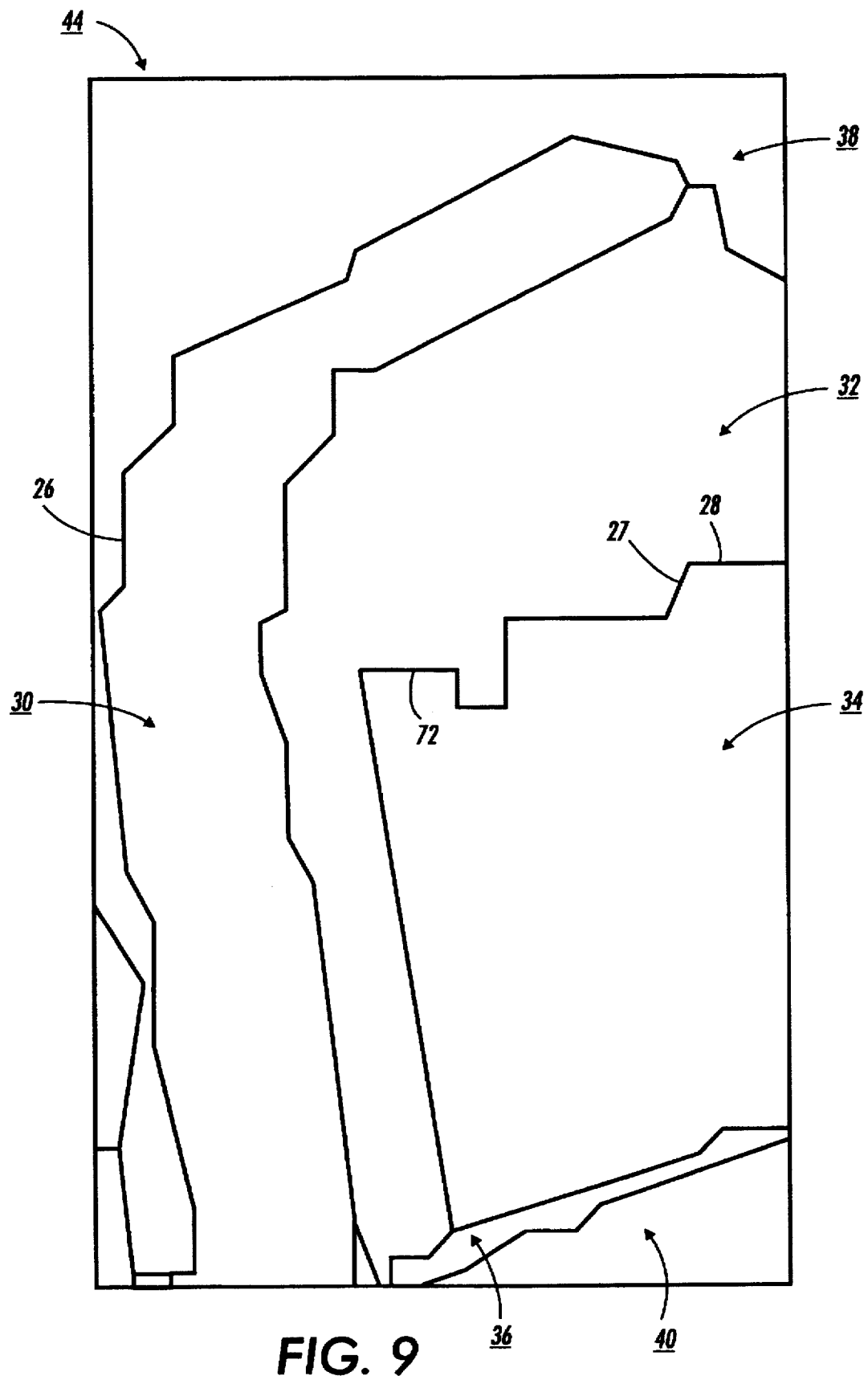
FIG. 9 illustrates a second image rendered from the image structure map data structure representation of the image of FIG. 6, for the portion shown in FIG. 7, and showing regions and region boundaries only.

Rendering operation 280 (FIG. 3) is able to produce rendered image 24 with or without region boundaries, and with or without showing the signal property descriptor of the regions. FIG. 9 shows rendered image 44, which is also rendered from the image structure map data structure produced for original image 2, and which also shows only the portion of the image structure map data structure that corresponds to original image portion 4 (FIG. 7). Rendered image 44 shows regions 30, 32, 34, and 36 with visible region boundaries, such as region boundaries 26, 27 and 28, but with no signal property descriptors. Rendered image 44 resembles a line drawing version of original image portion 4; it can be seen that this version of original image 4 shows the shapes of the regions and their relative positions to one another, conveying a great deal of information about original image 4.

The original image may also be displayed with image structures of the image structure map rendered and superimposed on it. Image 4 of FIG. 7 shows the region boundaries between the regions found in the image structure map data structure as thin line segments superimposed on original image portion 4 in image positions specified by the image structure map. For example, image region boundaries 6, 7 and 8 correspond to image region boundaries 26, 27 and 28 in FIG. 8. Close inspection of the region boundaries in image 4 show the shapes of regions 30, 32, 34, and 36, and show that these shapes correspond to color changes in original image 4.

6. Image Interaction Examples.

As noted earlier, a user of the image interaction system of the present invention may interact with either the displayed original image 12 or the rendered image 20 (FIG. 4.) For example, a user may decide, in comparing the original image portion 4 of FIG. 7 with the regions shown in rendered image 44 of FIG. 9, that the region boundaries between regions 32 and 34 need revision, and that region boundary 28 specifically should be deleted. Using some type of user interaction device, the user may select region boundary 28 from either the displayed version of original image 4 of FIG. 7 or rendered image 44 of FIG. 9 and indicate a deletion signal to the image interaction system. In response to receiving the region boundary location data and the deletion signal, region boundary deletion operation 250 (FIG. 3) deletes region boundary 28 from the image structure map data structure for original image 2.

Figure 10:
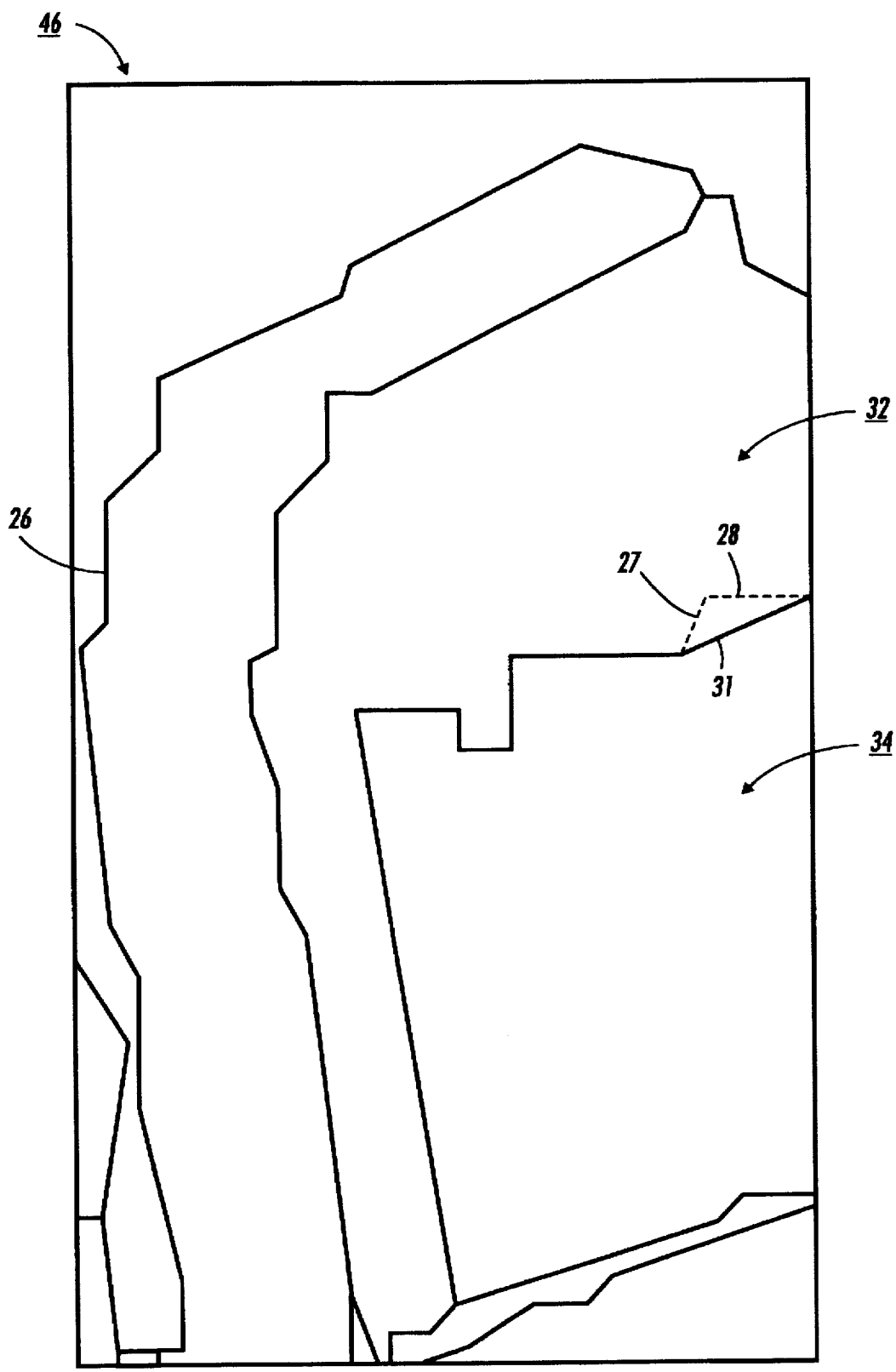
FIG. 10 illustrates a third image rendered from the image structure map data structure representation of the image of FIG. 6, for the portion shown in FIG. 7, and showing the result of deleting an image boundary from the image structure map.

With respect to image structure map 500 of FIG. 4, accomplishing the deletion operation involves deleting region boundary data structure 508 that indicates region boundary 28. Region boundary 27 that intersected with region boundary 28 in FIG. 9 must be revised to intersect with the boundary of the image, and the vertex data structure indicating the vertex at the end of region boundary 28 must be updated to reflect the position of its new vertex. FIG. 10 shows rendered image 46 with the result of deleting region boundary 28; boundary 28 is shown together with region boundary 27 in dashed lines for illustration purposes. New region boundary 31 is created when region boundary 28 is deleted.

Another example of user interaction with an original image or its rendered version is the user-directed insertion of region boundaries. For example, upon inspection of rendered image 46 in FIG. 10 and comparison with original image 4 of FIG. 7, a user may still want to modify region 34 to show the darker, interior rectangular area 9 that is visible in original image 4 (FIG. 7.) The user may trace the outline of rectangular area 9 on the displayed image of original image 4 using an interaction device such as a mouse or stylus, and signal an insertion function. Or, alternatively, the user may simply use a device such as a mouse or stylus to draw new region boundaries on rendered image 46 of FIG. 10, without the visual assistance provided by tracing around a portion of the original image. In response, the image interaction system locates the positions in the image structure map data structure where the new region boundaries are to be inserted; if the user traced around the original image, the image interaction system first locates the positions in the original image of the region boundaries that are being inserted, and then invokes region insertion operation 240 (FIG. 3) to insert the region boundaries into the image structure map for original image 2.

Figure 11:
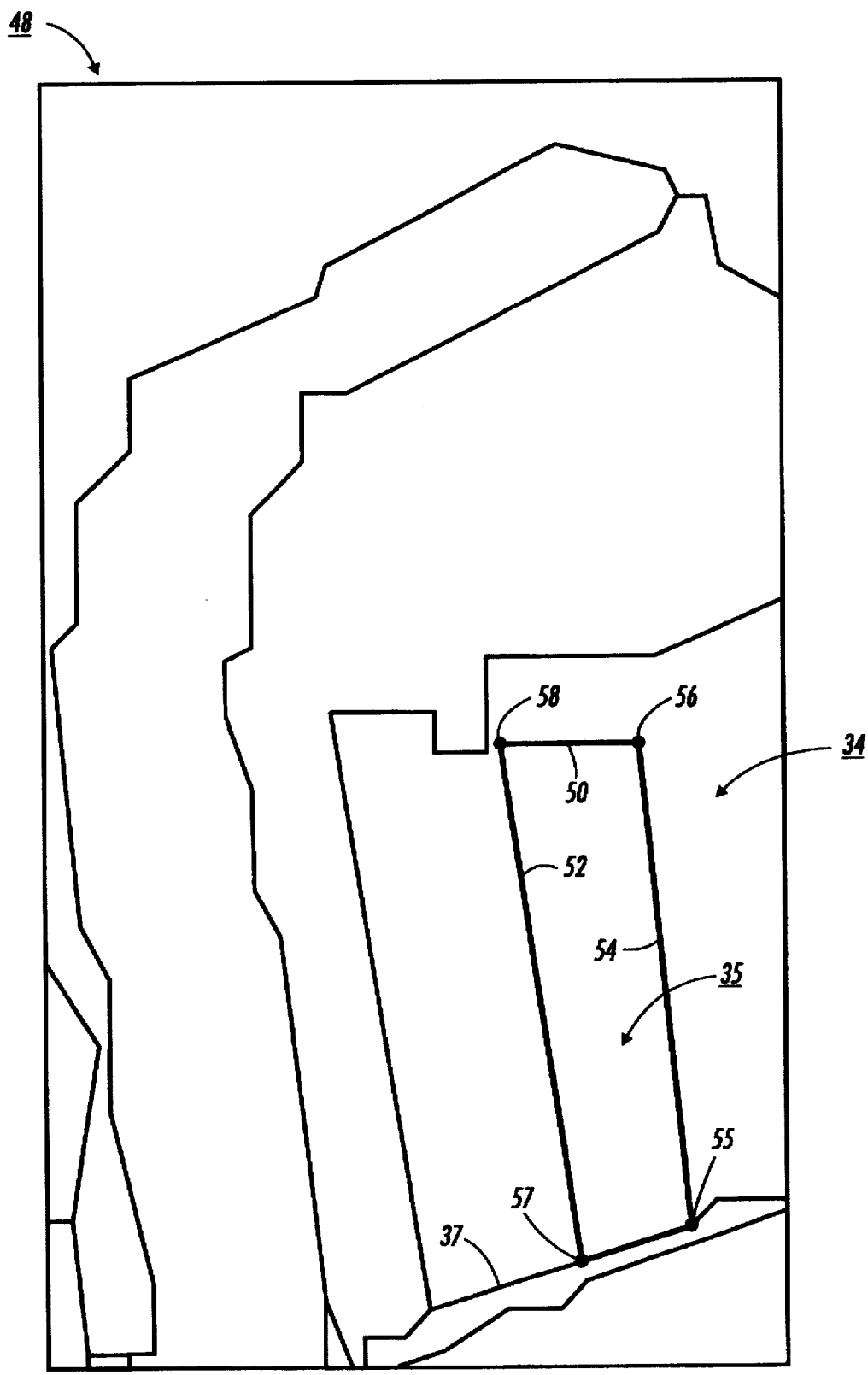
FIG. 11 illustrates a fourth image rendered from the image structure map data structure representation of the image of FIG. 6, for the portion shown in FIG. 7, and showing the result of adding an image region to the image structure map.

FIG. 11 shows rendered image 48 with the result of inserting region boundaries 50, 52 and 54 that form new region 35. With respect to image structure map 500 of FIG. 4, accomplishing the insertion operation involves adding a new region data structure 502 for region 35, and adding region boundary data structures 508 for each new region boundary 50, 52 and 54. New region 35 also includes three new vertices, 56, 57 and 58, and existing vertex 55 showing a new intersection, which are all adjacent to region 35; a vertex data structure for each of these new vertices is created, showing the locations of these vertices and the region boundaries to which they are each adjacent. The vertex data structure for vertex 55 is updated to show that it is now adjacent to region boundary 54. Region boundary 37, which is an existing boundary in the image structure map for original image 2, has been intersected by newly added region boundaries 52 and 54 at new vertex 57 and existing vertex 55, respectively. This effectively divides region boundary 37 into two pieces, and the region boundary data structure for boundary 37 is updated to reflect this change.

The insertion operation for a new region also provides for establishing a region signal property descriptor 504 for the new region. Whether an actual value of a new signal property descriptor is computed during the insertion process is an implementation decision, and several implementation alternatives are available. The actual value of the signal property descriptor may be computed at the time it is determined that a new region has been added to the image structure map. Or, alternatively, a default value for the signal property descriptor may be used at the time of creation, and an actual value computed only at the request of the user, or automatically during some other processing cycle, such as during rendering of an image from the image structure map.

The insertion and deletion interaction functions with the displayed version of an original image that are provided by the present invention effectively means that a user may trace all region boundaries in an image by hand, if desired, in order to create the image structure map for the image.

As noted earlier in the discussion of FIG. 4, another function provided by the present invention is the user's ability to interact with automatic operations that in turn provide interaction signals to image interaction operations 200 (FIG. 1.) One of these automatic operations is an automatic image segmentation operation that analyzes original image data structure 10 and produces region boundary locations in original image 10. In the illustrated embodiment described below, the automatic image segmentation program is able to produce segmentations of the original image at different levels of detail that are controlled by the user of the operation. The user may invoke the automatic image segmentation operation for just a portion of the image by providing image locations in the original image of the desired portion to the automatic segmentation operation and requesting a level of detail that may be greater or less than that already represented in the image structure map. The user's ability to invoke automatic segmentation in conjunction with the manual editing operations described above provide a powerful combination for interacting with an image using the image structure map.

It can be seen from these representative interaction examples that a user of the image interaction system of the present invention may perform a variety of editing operations on image structures in the image structure map. For example, image regions can be deleted, split into multiple regions, or merged with adjacent regions, in addition to being added to the image structure map. Any image structure editing operation that uses the basic functions of point location, insertion and deletion can be implemented as a higher level editing operation and made available to a user of the image interaction system.

7. Computing Signal Property Descriptors.

The computing of a signal property descriptor may either be requested by the user, or performed automatically as part of an interface operation with the image structure map, such as the building or updating of the image structure map for an image. The signal property descriptor of a region can provide a visible manifestation of its value in the rendered image the user sees displayed, such as, for example, rendered image 24 of FIG. 8 which shows each of the regions of image 24 filled with a shade of gray. As noted earlier in the discussion of signal property descriptor computation operation 260 of FIG. 3, operation 260 takes as input an image location either in displayed original image 12 or in rendered image 20 (FIG. 3) and signal property descriptor source data, and computes a signal property descriptor for the region in image structure map 500 that includes the input image location.

Figure 12:
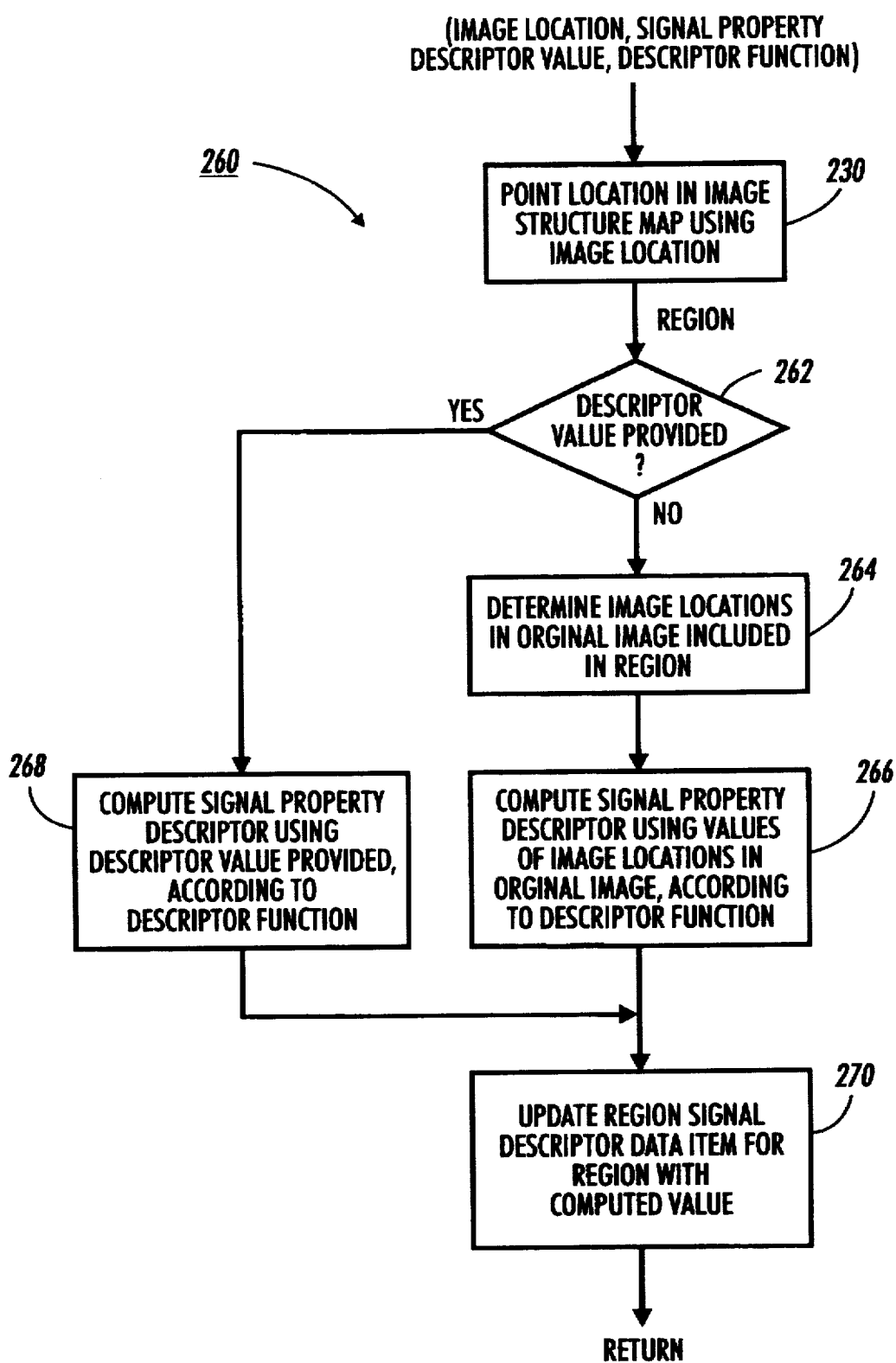
FIG. 12 is a flowchart illustrating operation 260 of FIG. 3 for interacting with the signal property descriptor of the image structure map data structure according to the present invention.

The flowchart of FIG. 12 illustrates the processing operations of signal property descriptor computation operation 260. An input image location indicates an image location in either the original image or in the rendered image; this image location indicates the region for which the signal property descriptor is to be computed. There may also be provided as input a signal property descriptor value. The user may specify a new signal property descriptor value for the region as an editing operation on the rendered image. For example, when the signal property descriptor is a color, the user may specify that a color appear in a region that is different from the currently displayed color for the region. There may also be provided as input a signal property descriptor function. Depending on the type of signal, a signal property descriptor may be able to be specified or computed in different ways, which may be controlled by a function. For example, when the signal property descriptor is a color, the color that appears in a region may be a constant color, or the color may appear in the region of a rendered image as varying over the region according to some color dimension. For some images, a varying color gives a preferred or more realistic appearance, or varying the color may create a desired special effect.

In response to initiating operation 260, a point location operation 230 is performed to determine the region(s) in the image structure map data structure that includes the input image location(s); because the image structure map accurately spatially indexes the original image, the input image location may be specified as being in either one of the original or rendered images; if the image location is specified in the original image, a coordinate transformation from the coordinate system of the original image to the coordinate system of the image structure map will provide an image location which may be used to locate a region in the image structure map.

The presence of an input descriptor value is tested, in box 262; if a descriptor value is not provided, source data from the original image is required for computing a signal descriptor. This source data is obtained in box 264; the two-dimensional extents of the region identified in the image structure map are used to determine the image locations in the original image that correspond with the region in the image structure map. The signal values of these original image locations are used to compute the signal property descriptor for the region, in box 266. This computation is performed according to the input signal descriptor function.

If a descriptor value is provided, source data from the original image is not required for computing the signal descriptor, and control transfers from box 262 to box 268, where the signal descriptor is computed using the input value(s) provided, according to the input signal descriptor function. The region data structure for the identified region in the image structure map is then updated, in box 270, with the new value for the signal property descriptor.

The computed value of the signal descriptor may itself include a function that indicates a value when computed later, for example, during a rendering operation. In the illustrated embodiment of the present invention described below, the signal property descriptor is a color descriptor for the region. A region color may be represented in two different ways: the rendered image may show a constant color for the region, or the rendered image may show a color that linearly varies in intensity values from one end of the region to the other. In the case of the constant color, no input function need be specified, and the region signal property descriptor indicates an actual color value. In the case of the linearly varying color in the region, the input function specifies that the color is a linear fit over the region, and the signal property descriptor indicates a three-by-three (3×3) matrix of parameters, from which the color of each rendered image location may be computed.

C. An Illustrated Embodiment of the Invention

An embodiment of the present invention has been implemented in software programs on a Silicon Graphics Indigo Elan computer running the Irix operating system, available from Silicon Graphics, Inc. (SGI) of Mountain View, Calif. The software programs implementing the invention are written in Allegro Common Lisp, a compiler for which is available from Franz Inc. of Berkeley, Calif.; the implementation uses the standard SGI Graphics Library supplied with the Irix operating system and a Common Lisp interface to the Graphics Library that Franz distributes. It will be apparent to those of skill in the art that a variety of programming languages and hardware configurations could readily be used in place of those in the illustrated embodiment based on the description herein without departing from the scope and intended utility of the present invention.

The description of this illustrated implementation presumes a knowledge of the fundamental principles of planar partition algorithms in general, and of algorithms for constructing trapezoidal decompositions in particular. One of many useful texts in this regard is Computational Geometry: *An introduction Through Randomized Algorithms*, by Ketan Mulmuley (Prentice-Hall, 1994). Several sections of that text discuss trapezoidal decompositions; several other sections of that text are useful as background; in particular, chapter 2 at pp. 29–35, 52–55, 58–66, and 78–96; chapter 3 at pp. 111–114 and 117–119; chapter 4 at pp. 126–135, 140–149, and 162–167; and chapter 5 at pp. 192–210 are all hereby incorporated herein by reference as if set out in full.

The present invention makes use of a method for dynamically producing a planar partition induced by a set of line segments, invented by the named inventors herein. While many of the details of this method are discussed below, additional information about this method may be found in Ser. No. 08/581,669, "Dynamic Computation of a Line Segment Arrangement Using Finite Precision Arithmetic." In addition, further information about this dynamic partition method may also be found in L. Guibas and D. Marimont, "Rounding Arrangements Dynamically," in *Proceedings of the 11th ACM Symposium on Computational Geometry* (SCG '95), Vancouver, B. C., June, 1995, which is hereby incorporated by reference herein as if set out in full.

1. The image structure map implemented using finite precision arithmetic.

The image structure map data structure of the image interaction system of the present invention is designed and implemented to support dynamic editing of the image structures included in the data structure as those image structures relate to an original image. A critical aspect of efficient and fast dynamic editing operations is the ability of the image structure map to provide an accurate spatial index into the original image in order to be able to accurately locate structures in the image structure map. Computing intersections of region boundaries, in particular, may yield a real number that is only able to be represented to a processor according to its finite precision model, resulting in a rounding or truncation operation of the actual location of the intersection. Subsequent computations using the rounded or truncated intersection location may result in moving the intersection, or another intersection, an unacceptable distance from its actual location, or may move it to a location that is topologically inconsistent with the actual location of the intersection in the original image.

To prevent these problems, the illustrated implementation of the present invention produces an image structure map in which all vertices of image region boundaries (endpoints and intersections) have locations specified in machine representable numbers. Two important operations are needed to accomplish this: First, locations of the intersections and the endpoints of input region boundaries are rounded to machine representable numbers using a mathematically rigorous rounding operation. Secondly, the original locations of the input region boundaries provided by a user or by an automatic image segmentation operation are stored in the image structure map to ensure that the rounded image region boundaries are topologically consistent with the original input region boundaries.

Prior to describing the rounding operation, certain terminology is presented. In the illustrated embodiment, image region boundaries are specified as line segments.

a. Terminology used in the finite precision implementation.

An "unrounded line segment," also referred to herein in an abbreviated manner as an "ursegment," is an input region boundary and may have the values of the coordinates of each of its endpoints in the plane specified as real numbers. An "unrounded vertex," including both endpoints and intersections of unrounded line segments, has the values of the coordinates of its location in the plane specified as real numbers. The rounding operation makes use of a conceptual Euclidean plane that is tiled into unit squares, each of which is referred to as a "pixel." The plane is assigned coordinates so that pixel centers have integral coordinates; a pixel center is called an "integral point," or a "representable point." The pixels and integral points form a grid in the plane. A "hot pixel" is a unit square (pixel) in a grid of pixels that contains an unrounded vertex (i.e., either an ursegment endpoint or the intersection point of two ursegments.)

A point having real coordinates on a line segment, such as an unrounded vertex, is said to be "perturbed to" or "rounded to" an integral point when the real coordinates of the point are replaced by integer coordinates; an unrounded vertex that is perturbed to an integral point may be referred to as a "rounded vertex" or a "perturbed vertex." "To perturb" an unrounded vertex means to replace its real coordinates with integer coordinates.

A "rounding operation" is one or more operations that takes as input either an unrounded line segment or an unrounded vertex or both and produces a rounded vertex perturbed to an integral point that is determined by the operation(s). A rounding operation may also be referred to as a "set of rounding rules," or a "rounding scheme."

A "polysegment" is the polygonal line that results when all of the vertices in an unrounded line segment (i.e., an ursegment) are perturbed to integral points. A polysegment includes one or more line segments, each of which is called a "fragment." When the endpoints of an ursegment are the only points of the ursegment perturbed to integral points, the polysegment contains only one fragment. By definition above, a point on a line segment having real coordinates that is not a vertex, referred to herein as a "nonvertex point", may also be perturbed to an integral point; perturbing a nonvertex point produces a rounded vertex in place of the point on the line segment.

b. The rounding operation of the illustrated implementation.

The rounding operation employed in the illustrated implementation of the present invention includes a set of rounding rules that are mathematically provable as producing a rounded partition that is topologically consistent with the partition of their original ursegments. These rounding rules are used during region boundary insertion operations to ensure that locations of vertices are stored in the image structure map as representable points. The first rounding rule states that when a vertex occurs within the boundary of a hot pixel, the vertex is perturbed to the integral point of the hot pixel. The second rounding rule states that when an ursegment passes through a hot pixel, it is perturbed to pass through that pixel's integral point. The rules provide that a fragment is added to an ursegment only where a vertex of the partition lies on the segment, or where the ursegment passes "near" an integral point which will become a vertex of the rounded partition, where "near" is defined as being within the boundary of the hot pixel.

Figure 13:
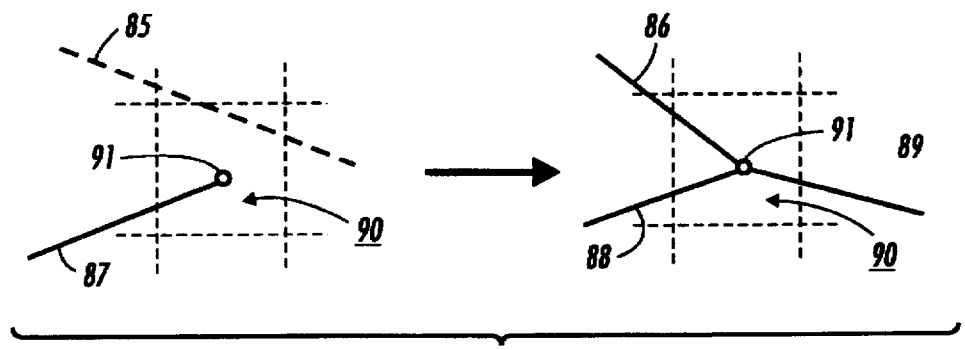
FIG. 13 illustrates the first of two rules used to represent vertices in the image structure map data structure as machine representable points according to an illustrated embodiment of the present invention.
Figure 14:
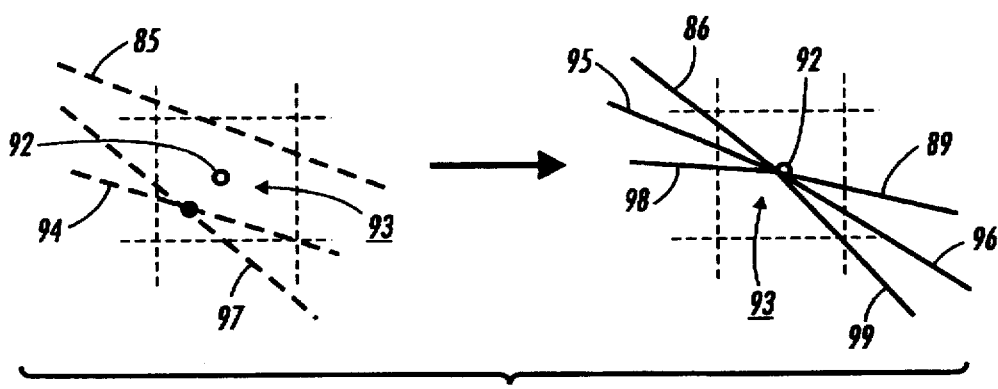
FIG. 14 illustrates the second of two rules used to represent vertices in the image structure map data structure as machine representable points according to an illustrated embodiment of the present invention.

FIGS. 13 and 14 illustrate the two rounding rules. With reference to FIG. 13, the left side of FIG. 13 shows two ursegments 85 and 87 in a portion of a plane that includes pixel 90; ursegment 87 terminates in pixel 90, such that pixel 90 includes a vertex (the endpoint), thus making pixel 90 a hot pixel; ursegment 85 passes through the hot pixel. The right side of FIG. 13 shows the result of applying the two rules. It can be seen that the first rule results in ursegment 87 being perturbed to integral point 91; ursegment 87 thus becomes perturbed segment 88. The second rule results in ursegment 85 being divided into two fragments 86 and 89 of what is now a polysegment; this is required in order to perturb ursegment 85 to integral point 91. Note that ursegment 87 may also be divided into two (or more) fragments, depending on whether the remaining portion of ursegment 87 not shown in FIG. 13 passes through one or more additional hot pixels; if only the endpoints of ursegment 87 are perturbed, the rounding operation produces a polysegment having only one fragment.

FIG. 14 illustrates the rounding rules applied to a hot pixel that contains an intersection of two ursegments and an ursegment that passes through a pixel containing an intersection. The left side of FIG. 14 shows three ursegments 85, 94 and 97 in a portion of the plane that includes pixel 93; the ursegments are distinguishable by the patterning used to draw them. Pixel 93 contains integral point 92. Ursegments 94 and 97 intersect in pixel 93, thus making pixel 93 a hot pixel; ursegment 85 passes through pixel 93. The right side of FIG. 14 shows the result of applying the rounding rules to ursegments 85, 94 and 97. As in FIG. 13, ursegment 85 is divided into two fragments, labeled 86 and 89, of what is now a polysegment. The vertex formed by the intersection of ursegments 94 and 97 is shown perturbed to integral point 92 on the right side of FIG. 14. This results in each ursegment being divided into fragments of a polysegment; ursegment 94 is divided into fragments 98 and 96, and ursegment 97 is divided into fragments 95 and 99.

When rounding is accomplished according to the set of rounding rules illustrated in FIGS. 13 and 14, several other topological properties of the rounded partition are also guaranteed: no fragments intersect except at their endpoints; if ursegment r intersects ursegment s and then ursegment t, then polysegment ρ cannot intersect polysegment τ before polysegment σ; and if a vertical line l through pixel centers intersects ursegment s and then ursegment t, then l cannot intersect polysegment τ before polysegment σ.

2. Image structure map data structures of the illustrated embodiment of the invention.

The implemented embodiment of the present invention builds a partition data structure of the original image having the form of a vertical trapezoidal decomposition, also referred to as a vertical cell decomposition (VCD.) This data structure is built dynamically and incrementally, inserting one input region boundary into the partition at a time; the partition is capable of being edited after each insertion. The initial state of the partition of the original image, prior to the insertion of the first region boundary, consists of a set of four boundary ursegments with integral endpoints arranged in a rectangular boundary that represents the rectangular extents of an input original image as it would be printed or displayed. Each of these boundary ursegments has one fragment.

Figure 15:
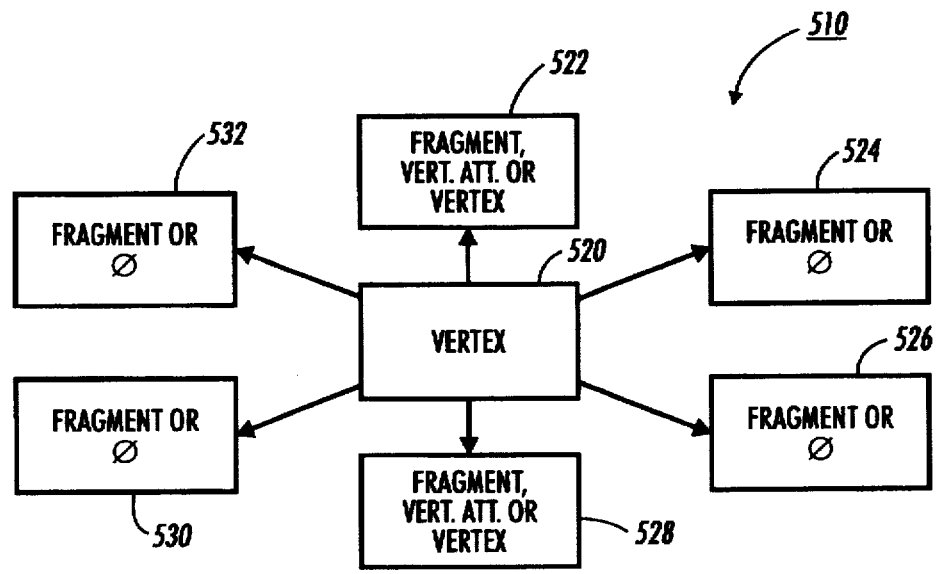
FIG. 15 schematically illustrates a vertex data structure that is part of the image structure map data structure representing the original image and produced according to the illustrated embodiment of the present invention.
Figure 16:
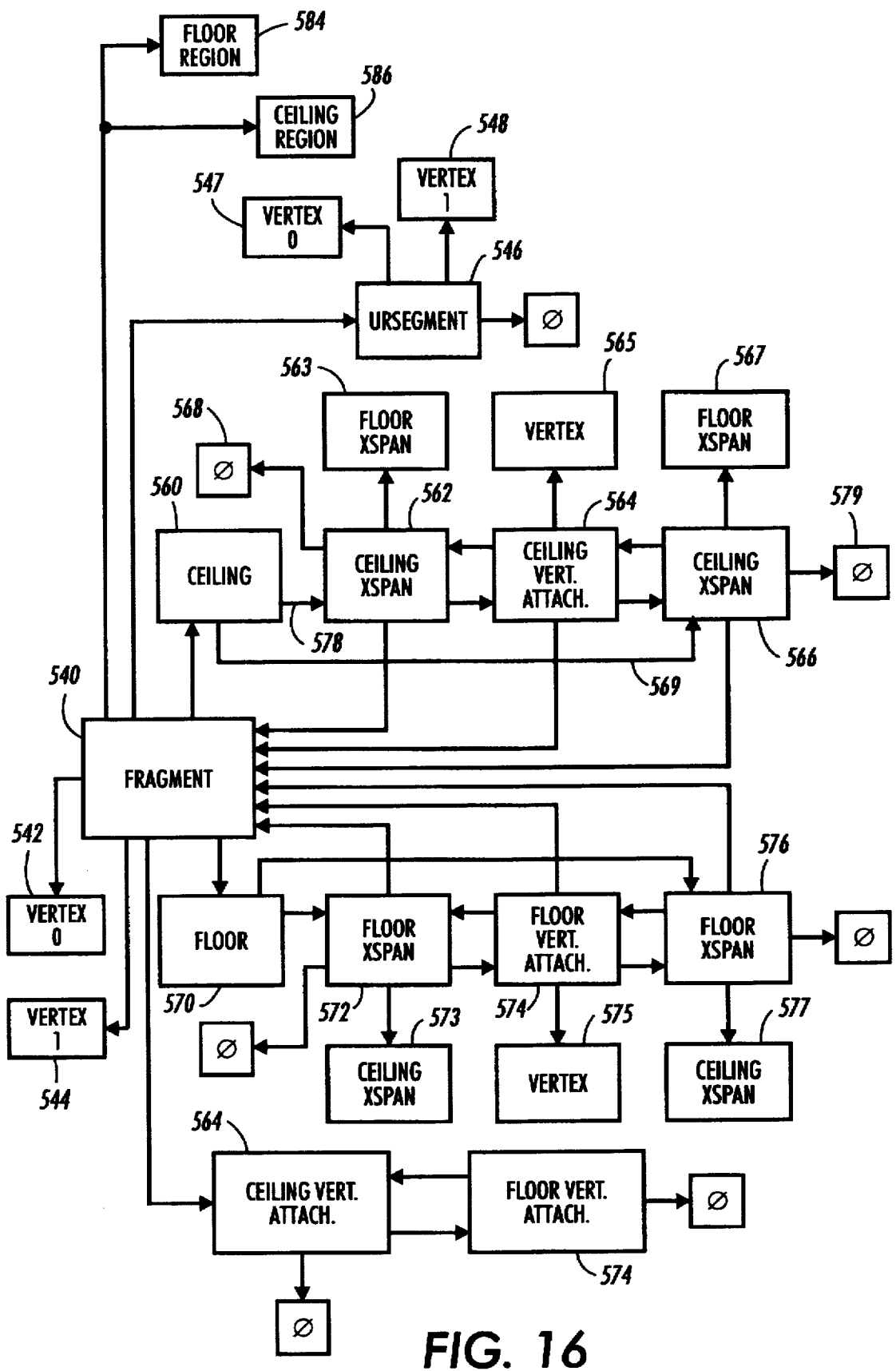
FIG. 16 schematically illustrates a representative fragment data structure that is part of the image structure map data structure representing the original image and produced according to the illustrated embodiment of the present invention.
Figure 17:
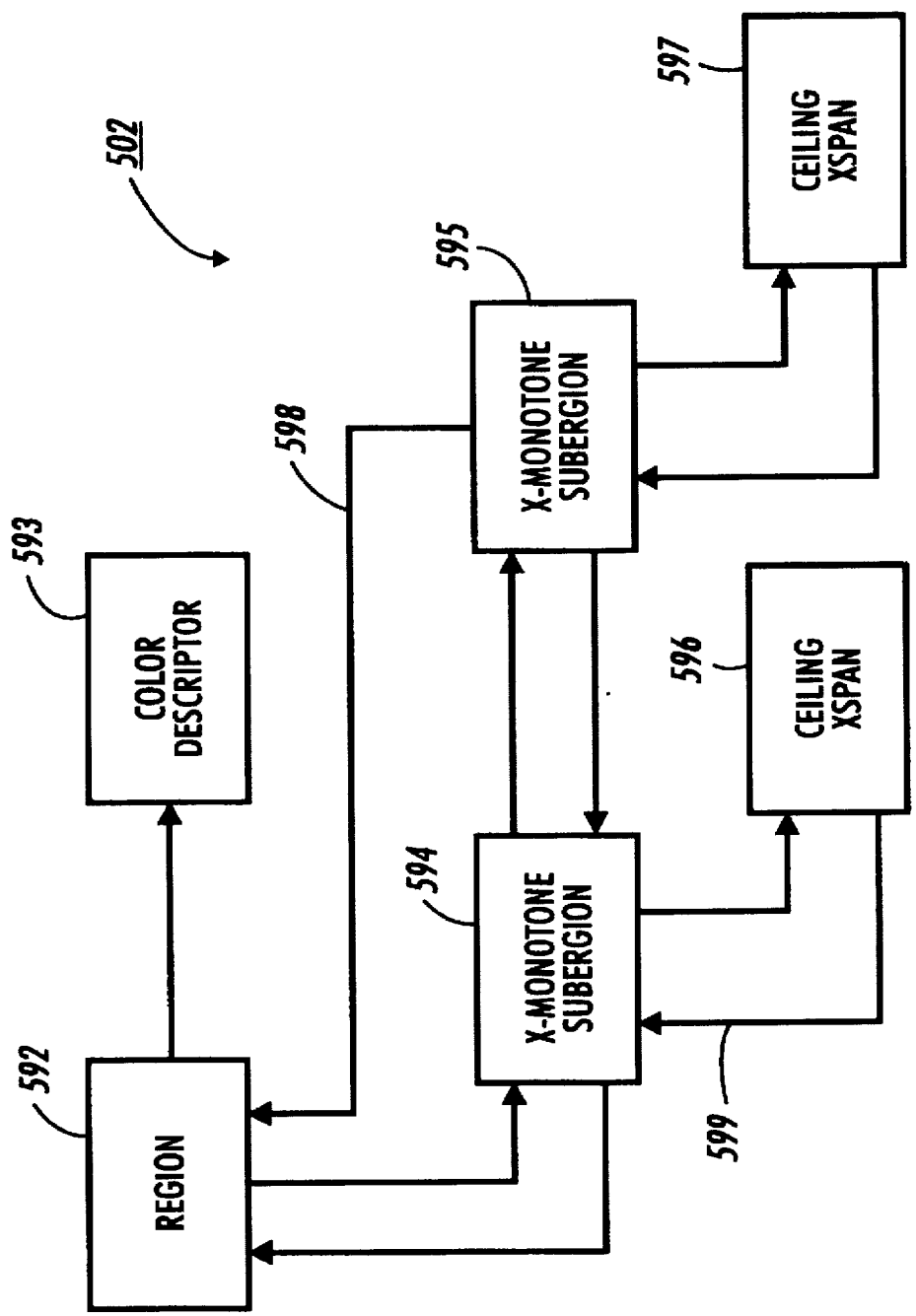
FIG. 17 schematically illustrates a representative region data structure that is part of the image structure map data structure representing the original image and produced according to the illustrated embodiment of the present invention.

FIGS. 15, 16 and 17 schematically illustrate three of the data structures that define an image structure map in the form of a VCD produced according to the illustrated embodiment of the present invention. Data items in the data structure are represented by labeled boxes in the figures. Descriptions of these data structures are referenced to rendered image 60 of FIG. 18, which shows a rendered view of the image structure map data structure for original image portion 4 of FIG. 7. Note that the portion of vertical ursegment 61 shown in FIG. 18 forms the right vertical boundary of original image 2 (FIG. 6.) In rendered image 60, vertices are shown as filled circles, fragments are shown as solid black lines, and vertical attachments are shown as dashed lines with arrows. Note that each region in rendered image 60 is divided into a number of cells, each of which has parallel vertical sides, except for degenerate cells such as triangles. FIG. 15 shows the vertex data structure; each vertex in the original image is represented by a vertex data structure of the type shown in FIG. 15. FIG. 16 shows a representative fragment data structure for a nonvertical fragment; each of the nonvertical fragments that result from inserting and rounding an image region boundary from the original image is represented by a fragment data structure of the type shown in FIG. 16. FIG. 17 shows a representative region data structure for an image region in the original image; each region in the original image is represented by a region data structure of the type shown in FIG. 17. There is a third data structure, not shown in the figures, for representing information about a vertical attachment, and a separate data structure, also not shown for representing information about vertical fragments. In FIG. 18, rendered image 60 shows vertical attachments as dashed lines with a single arrow at one end, for a single vertical attachment, and arrows at both ends for a double vertical attachment. Examples of single vertical attachments illustrated in FIG. 18 include vertical attachments 70 and 71; an example of a double vertical attachment is identified by reference numeral 64. Fragment 73 is an example of a vertical fragment. The region, vertex, vertical and nonvertical fragment and vertical attachment data structures collectively represent the VCD of the original image that is built by the illustrated embodiment of the present invention. The entire image structure map data structure is accessed by a pointer to the left vertex of the bottom horizontal boundary ursegment.

a. The vertex data structure.

With reference to FIG. 15, vertex data structure 510 includes vertex location 520 of a vertex in the original image. Vertex 520 includes pointers to all other structures in the VCD that are adjacent to vertex 520, as shown by the arrows that point to boxes 522, 524, 526, 528, 530 and 532. The vertex pointers in the illustrated embodiment are defined according to the geometry of the partition, such that box 522 points to a fragment, vertical attachment or another vertex that is positioned vertically above vertex 520 in the partition, while box 528 points to a fragment, vertical attachment or another vertex that is positioned vertically below vertex 520 in the partition. Note that a vertex points to a vertical attachment when that vertical attachment is directed away from the vertex, represented by the arrowheads at the end of the vertical attachments shown in FIG. 18. When vertices are vertically aligned, each has a vertical attachment directed to the other, which form a double vertical attachment. Each vertex of the pair of vertically aligned vertices points to the other vertex in box 522 or box 528.

Box 524 of FIG. 15 contains the fragment in the partition that is adjacent to and positioned as the top-rust fragment of all fragments positioned to the right of vertex 520 in the partition (called the top right fragment), while box 532 contains the fragment in the partition that is adjacent to and positioned as the top-most fragment of all fragments positioned to the left of vertex 520 in the partition (called the top left fragment). Similarly, boxes 526 and 530 contain the fragments in the partition that are adjacent to and positioned as the bottom-most of all fragments positioned to the right and left, respectively, of vertex 520 in the partition (called the bottom right and bottom left fragments). There may be other fragments adjacent to vertex 520 in between the top and bottom fragments pointed to by vertex 520. These other fragments are located using a portion of the fragment data structure called the floor and ceiling lists, described in more detail below, since the ceiling list of the bottom fragment points to structures on the floor list of a fragment located above the bottom fragment, and thus these intermediate fragments can be located. Note that if there is only one fragment located to the right or to the left of a vertex, both top and bottom fragments point to the same fragment. Analogously, if no fragment is present at the right or left of a vertex, both top and bottom pointers are empty.

With reference to FIG. 18, vertex data structure 510 representing vertex 66 in the top right corner of rendered image 60 contains the location of vertex 66 in box 520; box 522 indicates a pointer to vertical attachment 63 (the top of which is not visible in rendered image 60,) and boxes 524 and 526 indicate a pointer to fragment 67. Vertical attachment 64 in FIG. 18 illustrates a double vertical attachment, and so box 528 indicates a pointer to vertex 65. Box 532 indicates fragment 68, and box 530 indicates fragment 69.

b. The fragment data structure.

With reference to FIG. 16, the fragment data structure indicates information about each nonvertical fragment 540 in the image structure map. Fragment data structures of the type shown in FIG. 16 are examples of an implementation of region boundary data structure 508 in FIG. 5. Fragment 540 points to the endpoints of the fragment, shown as left vertex 542 (labeled Vertex 0) and right vertex 544 (labeled Vertex 1). Nonvertical fragments typically have a sequence of structures above and below them, which are represented with two doubly linked lists called the "ceiling" (for the structures above) and "floor" (for those below) lists of the fragment. In addition to facilitating vertical motion from a nonvertical fragment, the ceiling and floor lists make it easy to move along the fragment. Nonvertical fragments 67, 68 and 69 in the upper right corner of rendered image 60 of FIG. 18, and nonvertical fragment 72 in the center of rendered image 60 are examples of the type of nonvertical fragments that are represented by the fragment data structure shown in FIG. 16. Fragment 72 in particular is a representative fragment that is stored in the fragment data structure illustrated in FIG. 16. In order to illustrate the image structures associated with fragment 72 in more detail, a portion of rendered image 60 in FIG. 18 is reproduced in FIG. 19 and includes nonvertical fragment 72 extending from left vertex 74 to right vertex 75 and its associated structures.

Figure 19:
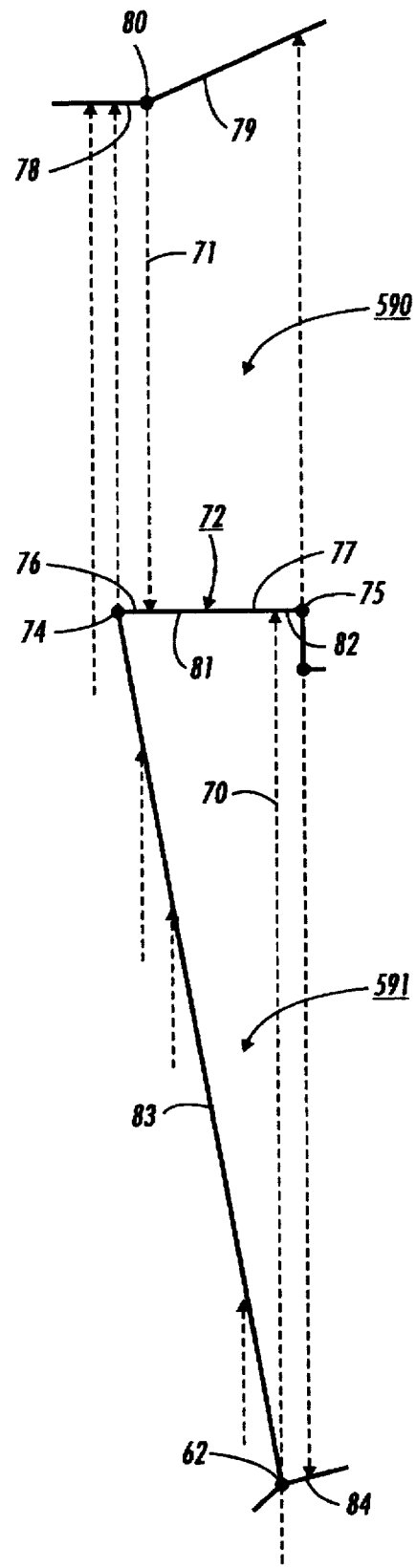
FIG. 19 is a portion of the vertical cell decomposition illustrated in FIG. 18 illustrating structures in the vertical cell decomposition that are included in the fragment data structure of FIG. 16.

A vertical attachment that is directed to a fragment defines a portion of the interval in x occupied by the fragment. This portion of the fragment in x is represented by a structure called an "xspan". When an xspan occurs as a structure above the fragment, it is called a "ceiling xspan;" similarly, when an xspan occurs as a structure below the fragment, it is called a "floor xspan.". Each trapezoid in the VCD is bounded below by a ceiling xspan (belonging to the fragment at the bottom of the trapezoid) and above by a floor xspan (belonging to the fragment at the top of the trapezoid). For example, trapezoid 590 in FIG. 19 is bounded below by the second ceiling xspan 77 of fragment 72, and above by the first floor xspan 79 of the fragment that begins at vertex 80 and extends out of FIG. 19. The floor and ceiling xspans that bound a trapezoid point to each other, which makes it possible to move vertically across a trapezoid.

The locations of the xspan structures are stored in data structures referred to as ceiling lists and floor lists. FIG. 16 illustrates ceiling list 560 and floor list 570 of representative nonvertical fragment 540. Each of the ceiling and floor lists in a fragment data structure includes an xspan, followed by zero or more sequences of a vertical attachment followed by an xspan that divide the remainder of the fragment. Each of the ceiling list 560 and floor list 570 in the fragment data structure of FIG. 16 are illustrated to include an xspan 562 or 572, followed by one sequence of a vertical attachment 564 or 574 followed by an xspan 566 and 576. The doubly-linked structure of the ceiling and floor lists is illustrated in the ceiling list by arrows 578 and 569, pointing to the head and tail of the lists, respectively, and by empty list items 568 and 579 at the end of each list path. Ceiling xspan 562 bounds the bottom of a trapezoid in the VCD and points to the floor xspan 563 that bounds the top of that trapezoid. Ceiling vertical attachment 564 points to the vertex data structure 565 from which ceiling vertical attachment 564 extends. Floor list 570 is organized in an analogous manner.

FIG. 19 in conjunction with FIG. 16 shows fragment 72 in more detail, and illustrates with a specific example the data contained in the ceiling list 560 and floor list 570 (FIG. 16) of a fragment. The structures on the top, or ceiling, of fragment 72 in FIG. 19 include ceiling xspan 76, followed by ceiling vertical attachment 71, followed by ceiling xspan 77. In the fragment data structure 540 of FIG. 16 for fragment 72, ceiling list 560 will include these structures as ceiling xspan 562, ceiling vertical attachment 564, and ceiling xspan 566, respectively. In addition, in FIG. 19 it can be seen that the structure opposite and above ceiling xspan 76 is floor xspan 78; ceiling vertical attachment 71 extends down from vertex 80; and the structure opposite and above second ceiling xspan 77 is floor xspan 79. Ceiling list 560 in the fragment data structure 540 of FIG. 16 for fragment 72 will also include these structures as floor xspan 563, vertex 565 and floor xspan 567, respectively, such that ceiling xspan 76 points to floor xspan 78, ceiling vertical attachment 71 points to vertex 80, and second ceiling xspan 77 points to floor xspan 79.

Similarly, the floor list 570 of fragment 72 in FIG. 19 is constructed in an analogous manner using the structures shown on the bottom, or floor, of fragment 72. These structures include floor xspan 81, followed by floor vertical attachment 70, followed by floor xspan 82. In the fragment data structure 540 of FIG. 16 for fragment 72, floor list 570 will include these structures as floor xspan 572, floor vertical attachment 574, and floor xspan 576, respectively. In addition, in FIG. 19 it can be seen that the structure opposite and below floor xspan 81 is ceiling xspan 83; floor vertical attachment 70 extends up from vertex 62; and the structure opposite and below second floor xspan 82 is ceiling xspan 84. Floor list 570 in the fragment data structure 540 of FIG. 16 for fragment 72 will also include these structures as ceiling xspan 573, vertex 575 and ceiling xspan 577, respectively, so that floor xspan 81 points to ceiling xspan 83, floor vertical attachment 70 points to vertex 62, and floor xspan 82 points to ceiling xspan 84. Note that ceiling xspan 83 is actually a complete fragment since cell 591 bounded by fragments 72 and 83 and vertical attachment 70 has the shape of a triangle and has only one vertical side.

In order to locate regions quickly from a fragment data structure, fragment data structure 540 in FIG. 16 also points to the regions above and below the fragment, in floor region pointer 584 and in ceiling region pointer 586. In the case of fragment 72 in FIGS. 18 and 19, it can be seen from FIG. 9 that fragment 72 is an image region boundary between region 32 above and region 34 below.

Two other linked lists are maintained with each fragment in the fragment data structure: a vertical attachment list and an ursegment list. To cross from the floor of a nonvertical fragment to its ceiling (or vice versa), fragment 540 points to a doubly linked list consisting of all vertical attachments on the floor and ceiling lists. In FIG. 16, a representative vertical attachment list shows ceiling vertical attachment 564 and floor vertical attachment 574 on this list; these correspond to vertical attachments 71 and 70 in FIG. 19.

Because rounding can cause two or more ursegments to share the same fragment, each fragment may be part of more than one ursegment; each fragment maintains a list of ursegments that it represents. Extensive experimentation has shown that these lists rarely have more than five ursegments. An ursegment points to the vertices at its endpoints. Fragment 67 in FIG. 18 may be an example of a fragment that belongs to two original image region boundaries.

c. The region data structure.

FIG. 17 illustrates region data structure 502 of the illustrated implementation of image structure map data structure 500 (FIG. 5) of the present invention. Region structure 592 points to color descriptor 593, which is the signal property descriptor for a region in the illustrated implementation. A color descriptors is either a single color, representing a constant fill color for the region when the image is rendered from the image structure map, or the color descriptor is a 3×3 matrix of parameters, which produces a color that linearly varies in intensity within the region. Region structure 592 points to a list of structures called x-monotone subregions. FIG. 17 shows region structure 592 pointing to two x-monotone subregions 594 and 595. Each x-monotone subregion points to its containing region, as illustrated in FIG. 17 by arrow 598, and to a list of ceiling xspans, ordered by ascending x-coordinate, which represent the bottom xspans of the cells in the subregion. FIG. 17 shows each x-monotone subregion 594 and 595 pointing to a single ceiling xspan 596 and 597, respectively. Each xspan in turn has a pointer to the subregion that contains it, as illustrated by arrow 599.

Figure 20:
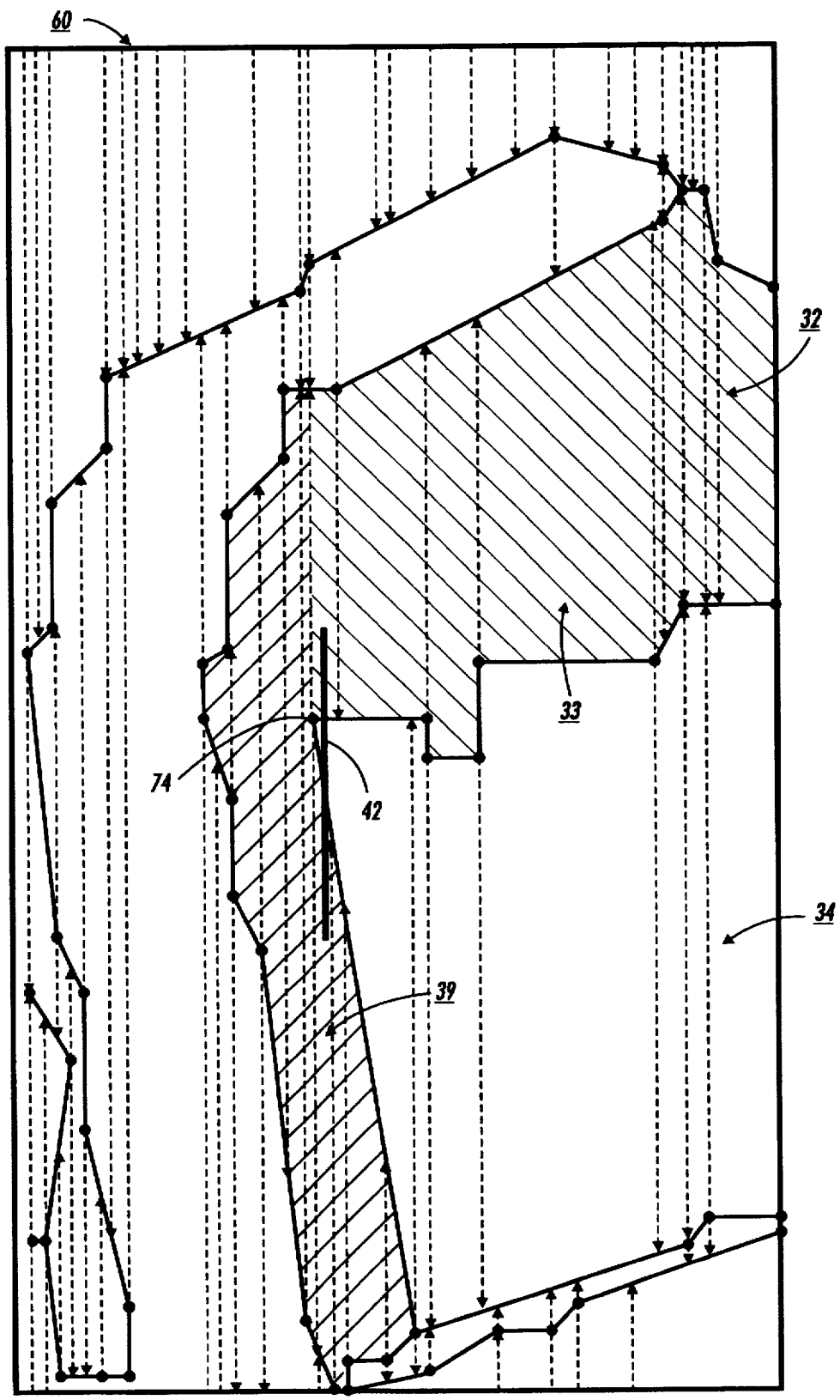
FIG. 20 is the rendered image of FIG. 18 illustrating the concept of an x-monotone subregion of an image region that is part of the region data structure illustrated in FIG. 17.

Each x-monotone subregion has the property that any intersection of the subregion with a vertical line is a single vertical line segment, or the empty set. The x-monotone subregions divide the region, and each subregion's cells further divide the subregion, so the union of cells in all of a region's subregions divide the region. FIG. 20 illustrates the concept of an x-monotone subregion. FIG. 20 illustrates rendered image 60 (first shown in FIG. 18) with image region 32 shown in heavy outline and with two types of cross-hatching. Region 32 surrounds region 34 above and to the left. Region 32 is an example of an image region with two x-monotone subregions. It can be seen that the intersection of vertical line 42 with the region 32 results in two line segments, and so the intersection is neither a single vertical line segment, nor the empty set. This means that region 32 cannot be a single x-monotone subregion, and must be divided. At all x positions at or to the left of vertex 74, and at all x positions to the right of vertex 74, the intersection of vertical line 42 with the respective portion of region 32 is a single vertical line segment, and thus vertex 74 and its associated vertical attachment mark the dividing line between the two subregions 33 and 39, which are shown with different diagonal cross-hatching.

d. Other data structures.

The two data structures not shown, the vertical attachment data structure and the vertical fragment data structure, are organized as follows. A vertical attachment data structure, such as ceiling vertical attachment 564 of FIG. 16, indicates its originating vertex, whether it is a ceiling or a floor vertical attachment, and the fragment with which it is associated. A vertical fragment data structure, indicates its vertices and a list of the ursegments that it represents. Fragment 73 in the center of rendered image 60 of FIG. 18 would be represented in the image structure map by a vertical fragment data structure.

e. The data structure hierarchy.

The illustrated embodiment of the image structure map of the present invention produces a hierarchy of vertical cell decompositions of the image, where the lowest level (level zero) contains all the ursegments, and each successively higher level contains a subset of the ursegments present one level down. Adjacent levels are linked through their hot pixels and ursegments; each hot pixel or ursegment at level i has a "descent" pointer down to the corresponding hot pixel or ursegment at level i−1. Hot pixels and ursegments are the structures chosen to link VCDs at adjacent levels because, unlike either fragments or vertical attachments, hot pixels and ursegments form a strict hierarchy: once a hot pixel or ursegment appears at a level, it must appear at all lower levels. Note that the entire hierarchy is accessed by a single pointer to the left vertex of the bottom horizontal ursegment in the top (zero) level of the hierarchy.

3. Image Structure Map Interface Operations

The discussion now turns to a description of implementations of several of the image structure map interface operations 220 shown in FIG. 3 above, using the image structure map data structure illustrated in FIGS. 15, 16 and 17. Specifically, an implementation of point location operation 260 is illustrated in FIGS. 21 and 22; an implementation of image region boundary insertion operation 240 is illustrated in FIGS. 23, 24, 25 and 26; and an implementation of image boundary deletion operation 250 is illustrated in FIG. 27.

a. Point location.

The data structures of the image structure map make it easy to move both vertically and horizontally in an image structure map. Moving vertically from a vertex, vertical fragment, or vertical attachment is straightforward because each can have only one structure above and one below. Movement both vertically and horizontally is facilitated by the xspan structures. FIG. 21 is a flowchart showing point location operation 400 for locating a point in the image structure map data structure hierarchy; FIG. 22 illustrates point location in a single level. The point location operation illustrates how the data structures representing the image structure map are used.

A point in the image may be located at a vertex, at a position on a fragment, at a position on a single or double vertical attachment, or in the interior of a trapezoid. Point location operation 400 takes as input a set of x, y coordinates that define a point in the coordinate system of the image structure map; this point could have been provided as an image location in either the rendered or original image, and transformed to the coordinate system of the image structure map prior to the calling of point location operation 400. Point location operation 400 returns a vertex if the point is at a vertex, a floor and ceiling list entry that includes the point if the point is on a fragment, a vertical attachment if the point is on a vertical attachment, and, if the point is in the interior of a trapezoid, the ceiling (bottom) xspan of the trapezoid. Point location operation 400 may also be implemented to return a region.

With reference to FIG. 21, to locate a point at the bottom (most detailed) level of the hierarchy of the vertical cell decompositions that comprise the image structure map, first locate it in the top (least detailed) VCD in the hierarchy, say at level i, in box 410. FIG. 22 shows a technique for locating a point in a level of the hierarchy in the illustrated embodiment. First, in box 414, the xspan containing the x coordinate of the point is found by linearly searching the ceiling list of the horizontal fragment that defines the bottom of the image structure map's bounding rectangle. Then, in box 418, an upward search in y is carried out, using the vertical structures in the image structure map (i.e., the vertices, vertical attachments and vertical fragments) and using xspans to cross trapezoids, until the image structure that contains the point is found.

Returning to FIG. 21, once the structure containing the point is found, a nearby vertex, which by definition is in a hot pixel, is found next, in box 420, using the image structure found by technique 410 and that structured pointers; this nearby hot pixel is never more than a pointer or two away, because every cell has at least two hot pixels on its boundary. The descent pointer of the nearby hot pixel is then used, in box 420, to locate the corresponding hot pixel in the image structure map one level down, at level i−1. To locate the point from a vertex (in a hot pixel) at level i−1, a straight line is traced through the image structure map from the hot pixel to the point, in box 412. The current level is tested, in box 426, to see if the bottom level of the hierarchy of image structure maps has been reached; if so, the structure that includes the point can be found using the pointers in the vertex data structure and the coordinates of the traced line, and this structure is then returned, in box 428. If the bottom level has not yet been reached, steps 420 and 424 are repeated until the bottom level of the hierarchy has been reached.

b. Inserting ursegments in the illustrated embodiment of the present invention.

As noted earlier, the image structure map data structure of the image interaction system of the present invention is designed and implemented to support dynamic updating of the image structures included in the data structure. Dynamic updating requires that image region boundaries be able to be inserted in and deleted from the image structure map in an incremental manner, without the need to now a priori all of the image region boundaries that will ultimately be included in the image structure map; this in turn requires that insertion and deletion operations 240 and 250, respectively, of FIG. 3, be implemented as dynamic operations.

FIG. 23 illustrates operation 300 for inserting an unrounded line segment s into the image structure map data structure according to the illustrated embodiment of the present invention. Insertion operation 300 involves two general concepts: first, the polysegment, σ, of s and all of its fragments must be determined so that fragment data structures of the type illustrated in FIG. 16 can be inserted into the image structure map data structure. Secondly, the insertion of s creates new hot pixels through which pass existing ursegments stored in the image structure map; to complete the insertion of s according to the rounding operation rules of the illustrated embodiment, these existing ursegments must be rounded to the integral points of the respective new hot pixels through which they pass.

The illustrated embodiment of the present invention uses three different searches in the image structure map data structure to accomplish insertion. Two of these searches, in boxes 310 and 340 of FIG. 23, locate the new and existing hot pixels that new ursegment s passes through. Ursegment s is rounded to the integral points of these new and existing hot pixels, creating vertices on s. The polysegment σ of s is defined by the vertices of the new and existing hot pixels found in these two searches. Once the vertices of q are known, they are added to the image structure map, in box 360.

Existing ursegments may pass through the new hot pixels created by inserting ursegment s into the image structure map data structure. For each vertex, v, of a new hot pixel, the search in box 380 locates the existing ursegments that pass through v's new hot pixel and perturbs the fragments of these ursegments to the integral point of the new hot pixel of v. The new fragments that result from this rounding are identified and new fragment data structures for the new fragments are added to the image structure map. For a fragment that is already in the image structure map data structure, only the ursegment it represents is required to be add to the existing fragment's list of ursegments.

Then, in box 396, those fragments of the polysegment σ of s not already in the image structure map are added to the image structure map, in box 396. These new fragment data structures have the new ursegment s as the only member of the fragment's list of ursegments. By the topological consistency properties of the rounding operation of the illustrated embodiment, these fragments intersect no others, which makes the insertion straightforward. For a fragment of σ that is already in the image structure map data structure, only the new ursegment is required to be add to the existing fragment's list of ursegments. Storing ursegments in the image structure map, in box 398, simply requires adding the ursegment to the appropriate fragment's list of ursegments.

Figure 24:
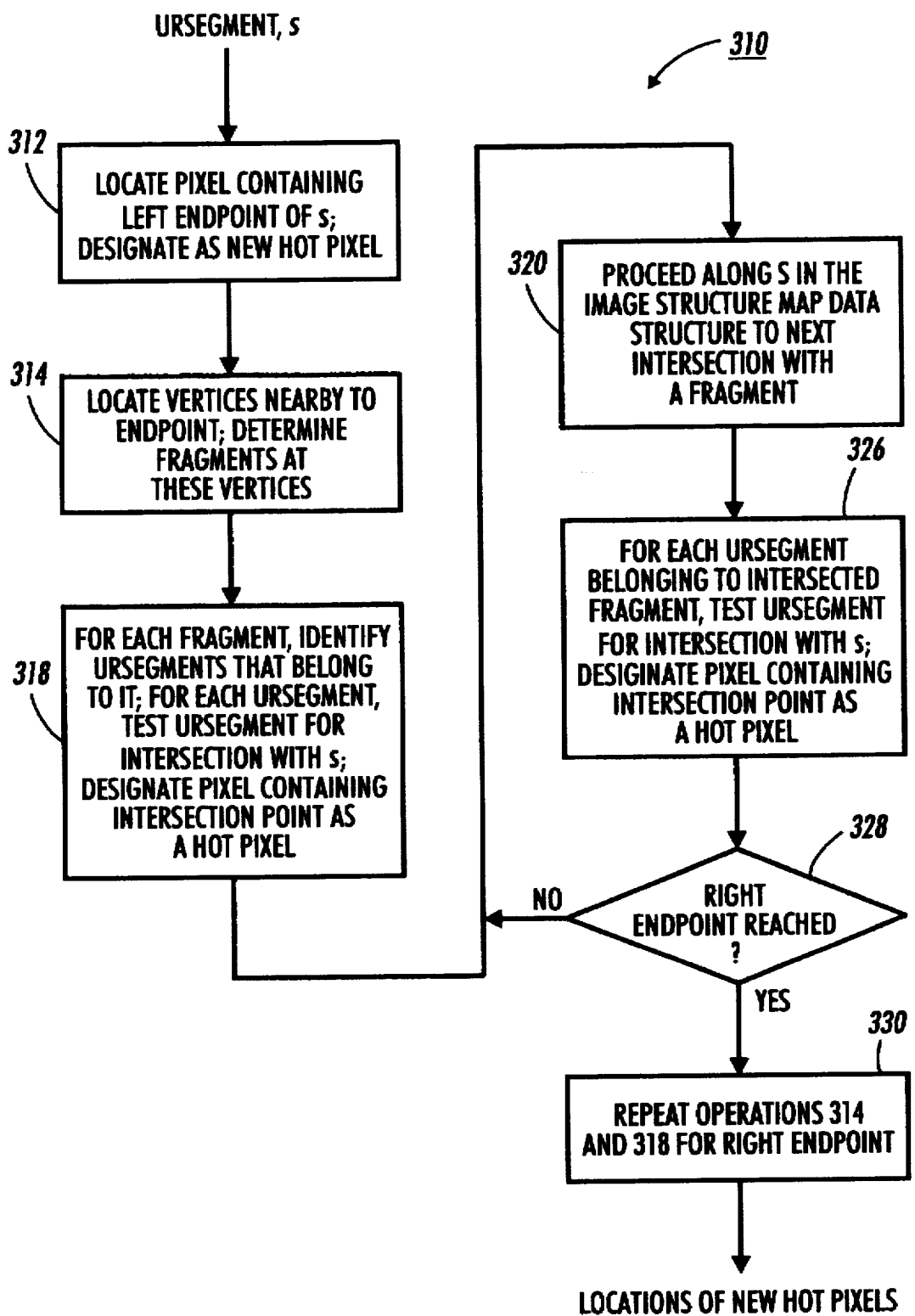
FIG. 24 is a flowchart illustrating one of the searches of the image structure map data structure illustrated in FIG. 23 to locate new hot pixels created by a newly inserted region boundary, according to an illustrated embodiment of the present invention.
Figure 25:
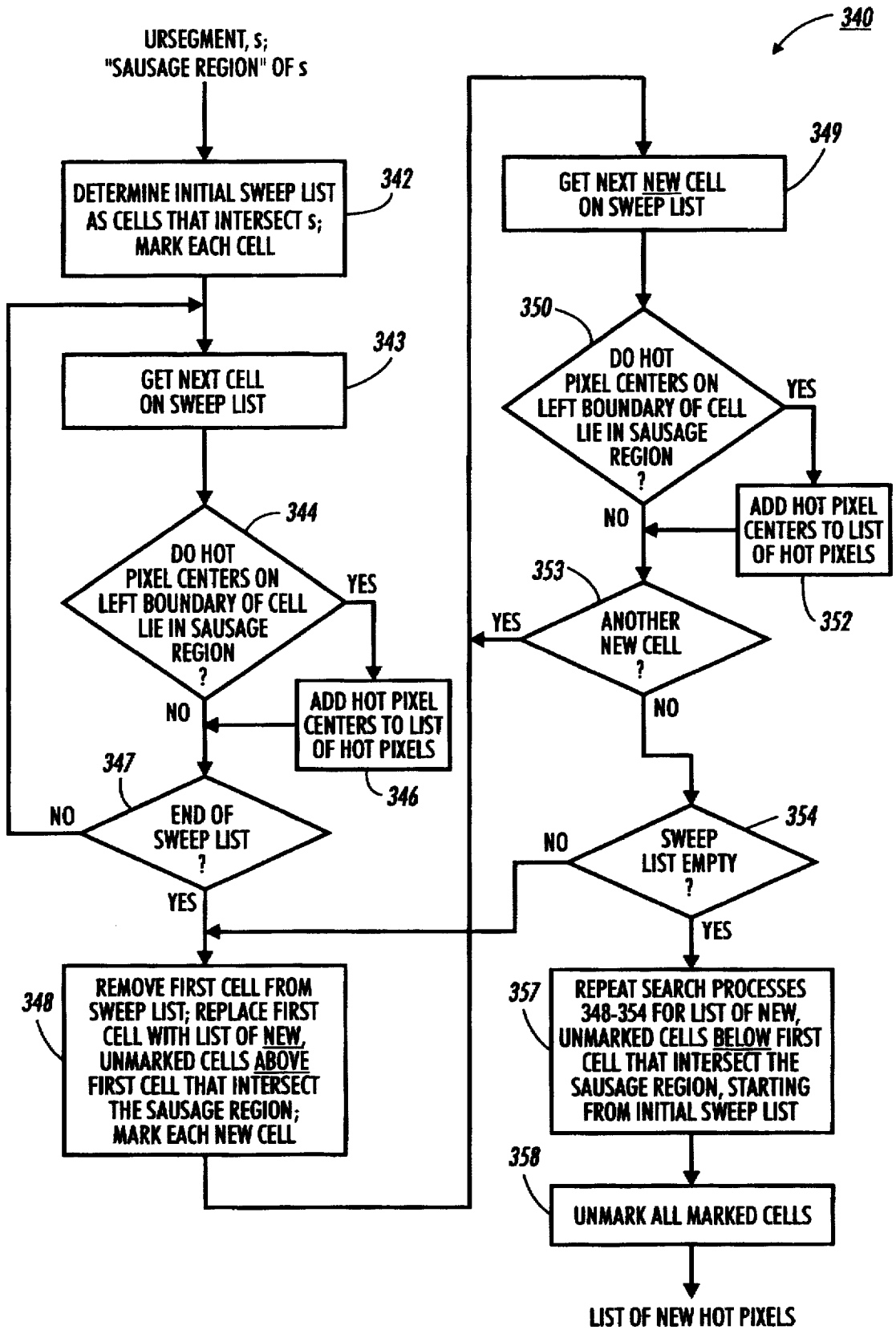
FIG. 25 is a flowchart illustrating another one of the searches of the image structure map data structure illustrated in FIG. 23 to locate existing hot pixels through which a newly inserted region boundary passes, according to an illustrated embodiment of the present invention.
Figure 26:
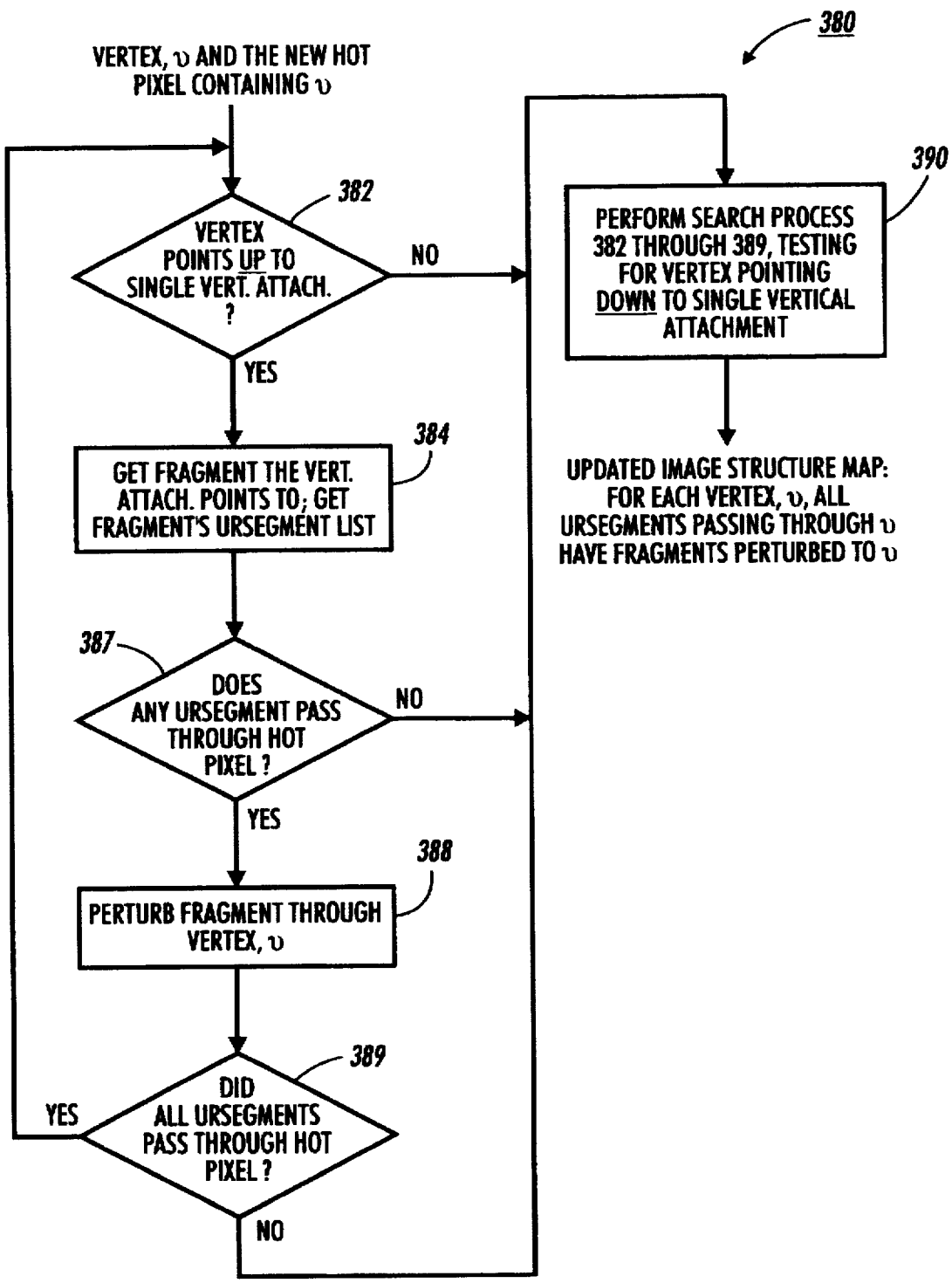
FIG. 26 is a flowchart illustrating a third search process shown in FIG. 23 through the image structure map data structure to find existing region boundaries that pass through new hot pixels, according to an illustrated embodiment of the present invention.

The discussion now turns to a description of each of these searches, which are illustrated in FIGS. 24–26.

i. Image structure map traversal for locating the ursegments that intersect new ursegment s.

With reference now to FIG. 24, search 310, called "VCD traversal," produces a list of the locations of the new hot pixels in the image structure map that result from the endpoints of s and from the ursegments that intersect s. The VCD traversal starts in the image structure map at the location of the left endpoint of s, in box 312. This pixel is designated as a new hot pixel. Then, the vertices near the left endpoint are located, and the fragments near each of these vertices are determined, in box 314. For each fragment, the ursegments that belong to it are identified, in box 318; for each ursegment identified, the ursegment is tested for an intersection with s, and each pixel containing an intersection is designated as a new hot pixel. Next, s is followed through the image structure map data structure to its next intersection with a fragment, in box 320. When s intersects a fragment, each ursegment belonging to the intersected fragment is tested, in box 326, for an intersection with s, and the pixel containing the intersection point is designated as a new hot pixel. A test is then made in box 328 to see if the right endpoint of the new ursegment has been reached. If it has not, the VCD traversal continues to the next intersection of s with a fragment, in box 320. If the right endpoint has been reached, the pixel containing the right endpoint is designated as a new hot pixel, and the endpoint operations in boxes 314 and 318 are repeated, in box 330. The new hot pixels are those containing the endpoints of s and its intersections with existing ursegments.

ii. The cell sweep search.

The operations of the second of the three searches, referred to as the "cell sweep search," are illustrated in FIG. 25; search 340 locates existing hot pixels through which s passes. First, a small region surrounding the length of ursegment s is defined as a search area; if an existing hot pixel is within this search area, the new ursegment s being inserted is required to be rounded to the integral point of that hot pixel by the rounding scheme. This search area is referred to as the "sausage region" of s, and is defined to be the Minkowski sum of s with a pixel centered at the origin. Search 340 is based on the following premises: If s passes through a hot pixel, the vertex at the pixel's center must lie in the sausage region of s. If a cell intersects the sausage region, the vertices contained in the cell may lie inside the sausage region. To find the hot pixels through which s passes, therefore, each cell that intersects the sausage region must be tested to determine whether the vertices that lie on the cell boundary are inside the sausage region. The search is carried out in the upward direction to the top of the sausage region, and then in the downward direction to the bottom of the sausage region.

With reference now to FIG. 25, the input to the cell sweep search 340 is the new ursegment s being inserted, and the sausage region of s. First, the cells that intersect s are determined, in box 342; these cells make up the initial sweep list, and each cell on this initial sweep list is marked to show that it has been searched. For the next cell on the sweep list (this is the first cell the first time through) obtained in box 343, the cell is tested, in box 344, to determine whether the hot pixel centers on the left boundary of the cell lies in the sausage region. If so, the hot pixel centers is added to the list of existing hot pixels through which s passes, in box 346, and control passes to the test in box 347. If the hot pixel centers on the left boundary of the cell does not lie in the sausage region, a test is made, in box 347, to determine whether the end of the initial sweep list has been reached. If not, control passes to box 343 to get the next cell on the sweep list; each cell on the initial sweep list is processed in the same manner, in boxes 344, 346 and 347 until the end of the initial sweep list is reached.

Next, in box 348, the upward part of the cell sweep begins; the first cell is removed from the sweep list, and replaced with a list of new, unmarked cells that lie vertically above the first cell and that intersect with the sausage region. If this first cell is called cell i, then for cell j to be above cell i, part of cell j's bottom boundary must coincide with part of cell i's top boundary. Note, however, that cells that are completely outside the sausage region are excluded from the sweep list. Note also that if there are no new cells to be added to the sweep list before adding, then the criteria for adding, then the cell that is now the current first cell on the sweep list is removed and replaced with a list of new, unmarked cells that lie vertically above this current first cell and that intersect with the sausage region; thus, the cell sweep, in addition to sweeping up and down, is sweeping horizontally, along the ursegment s until all the cells that intersect s are processed.

Also in box 348, each of the new cells just added to the sweep list is marked. Then the cell testing operations are made, in boxes 349,350, 352 and 353 until all of these new cells have been tested. When all of these new cells have been tested, a test is made in box 354 to determine if the sweep list is empty. If not, control returns to box 348, when the current first cell on the sweep list is removed, and replaced with a list of new, unmarked cells above the first cell that intersect with the sausage region, and this new set of cells is tested in the same manner. Thus, first cells are removed and replaced with cells above, if there are any, until the sweep list is empty.

Then, the downward part of the cell sweep begins, in box 357; it is entirely analogous to the upward cell sweep. At the conclusion of the downward cell sweep, marked cells are all unmarked, in box 358, and the list of hot pixels found in the search is returned. These are the existing hot pixels through which s passes, and, together with the new hot pixels that contain the vertices of the endpoints and intersections of s, they are used to determine the polysegment σ of s. The cost of the cell sweep is proportional to the number of cells that intersect the sausage region of s.

iii. The image structure map range search.

The VCD traversal search 310 (FIG. 24) produces a list of all of the vertices in the new hot pixels of s. These vertices may be conveniently used to find existing ursegments that pass through each new hot pixel. The search to find these existing ursegments is called a "vertical range search" and is illustrated in the flowchart of FIG. 26 as search 380. Search 380 takes as input a vertex v of a new hot pixel of s, and thus is repeated for each such new vertex. Search 380 is also divided into an upward and downward search in the image structure map. For the upward search, the input vertex v is tested, in box 382, to determine whether it points up to a single vertical attachment. If not, the upward portion of the search is complete, and control passes to the downward search, in box 390. If vertex v does point up to a single vertical attachment, the fragment that the vertical attachment points to is obtained, in box 384, and the ursegment list pointed to by that fragment is obtained.

The ursegments on the fragment's list are then tested, in box 387, to determine whether any one of the ursegments passes through the hot pixel of v. If any one does, the ursegment's fragment is perturbed to pass through v. Note that one of the consequences of perturbing this fragment is, of course, to divide it into two fragments; another consequence is that the vertical attachment that pointed to that fragment collapses, and there is now a vertical attachment extending up from the new vertex to the fragment above the one that was just perturbed. The ursegments for the fragment being tested is checked, in box 389, to see if all ursegments passed through the hot pixel. If so, this means that there is a new vertical attachment that may point up to another fragment that passes through the hot pixel of v; thus, control passes back to the text in box 382 to determine if there is such a vertical attachment. If at least one of the ursegments on the fragment list did not pass through the hot pixel of v, the upward search is complete, and control passes to the downward search, in box 390.

When it is determined, in box 387, that none of ursegments of the fragment being tested pass through the hot pixel of v, the upward search is complete, and control thus transfers to the downward search, in box 390.

Downward search 390 is completely analogous to the upward search illustrated in boxes 382 through 389 in FIG. 26. Completion of the upward and downward searches for existing ursegments that pass through a new hot pixels of a vertex v of s produces an updated image structure map where the existing ursegments found have fragments rounded to v.

iv. Inserting an ursegment in the image structure map hierarchy.

A new ursegment is inserted into the l bottommost levels of the hierarchy, where l is computed independently for each ursegment and equals the number of trials of flipping a coin until tails is obtained. To insert the ursegment, locate an endpoint at all levels of the hierarchy as above, and then insert the ursegment at the bottommost l levels independently using insertion operation 300 of FIG. 23. At each level, the descent pointers of the ursegment and of any new vertices created by the insertion are linked to the corresponding ursegments and vertices one level down.

c. Deleting ursegments in the illustrated embodiment of the present invention.

An ursegment is deleted from the hierarchy of vertical cell decompositions that comprise the image structure map by deleting it independently from each level. FIG. 27 illustrates the basic processes of implementation 391 of deletion operation 250 of FIG. 3. Deletion operation 391 takes as input an ursegment s that is to be deleted from an existing image structure map, and the current image structure map. Since ursegment s is represented in the image structure map as a polysegment, which shall be referred to as polysegment σ, the first process in the deletion operation is to determine the fragments that comprise polysegment σ of the ursegment that is to be deleted, in box 392. Those fragment data structures that are not included in any other ursegment are then deleted from the image structure map, in box 393, by removing s from each fragment data structure's list of ursegments. When an ursegment list of a fragment data structure becomes empty, no existing ursegment stored in the image structure map makes use of this fragment any longer, so the fragment data structure itself can then be deleted.

Certain fragments and vertices of existing ursegments were created when those ursegments passed through the hot pixels of ursegment s when s was originally added to the image structure map; thus, the hot pixels created when s was added to the image structure map need to be determined, in box 394; the vertices of σ in these new hot pixels are deleted from the image structure map, in box 395, if their inclusion in the image structure map is the result solely of s having ended or intersected another ursegment in the pixel when s was added to the image structure map. Determining these vertices can be decided efficiently by using the order in which the ursegments enter or leave each pixel determined to be a new hot pixel of s. Collectively, these deletion operations leave the image structure map in the state in which it would have been had s never been inserted.

4. Automatic image segmentation as a source of input image region boundaries.

The illustrated implementation of the present invention uses automatic image segmentation software to locate image region boundaries in an original input image data structure. This software is called MegaWave2, and is available by license for research purposes from CEREMADE, URA CNRS 749 de l'Universite Paris-IX Dauphine, 75775 Paris cedex 16, France, and carries a copyright for the preprocessor of ©1988–1994 Jacques Froment, Paris-IX Dauphine University, and a copyright for the software modules of ©1993–1994 Jacques Froment and Sylvain Parrino, Paris-IX Dauphine University.

MegaWave2 includes a collection of image processing algorithms described as C functions that operate without any assumption about the context in which the modules are executed. A MegaWave2 compiler is comprised of a MegaWave2 preprocessor followed by a standard C compiler that creates from a module a run time command, a function of a library or a function to be run under a window-oriented interpreter. The licensed software includes the source code of the modules, the system libraries (object code only), the preprocessor (in executable form), documentation, and some utilities. The libraries and preprocessor are available for Hewlett Packard HP-UX A.09 and Sun Microsystems Sparc SunOS 4.1. machine architectures and operating systems.

MegaWave2 includes a module that implements the color image segmentation algorithm described in G. Koepfler, C. Lopez and J. M. Morel, in "A Multiscale Algorithm for Image Segmentation by Variational Method," *Journal of Numerical Analysis of the Society of Industrial and Applied Mathematics*, Vol. 31, No. 1, February 1994, pp. 282–299. This paper, which is briefly described above, is hereby incorporated by reference herein as if set out in full.

The color image segmentation software provided by MegaWave2 takes as input a color image, the number of regions desired for the segmentation, and three weights on the RGB components of the image that are used to compute an error measure. The software searches for the minimum of an objective function that takes into account the error in the constant color approximation to the color image and the length of the boundaries between the regions, with a goal toward keeping the error and length as small as possible. Each pixel in the input (original) image is initially assigned to its own region; the regions are then merged. Each pair of neighboring regions is a candidate for merging; a pair is merged when its contribution to the objective function is smaller than that of any other pair. Merging continues until the total number of regions is less than or equal to the number requested. The boundaries of these regions are then written to a file. The boundaries are actually the edges between the pixels, so they include many short segments and "staircases." In the illustrated implementation described herein, the MegaWave2 color image segmentation module was modified to accept more image formats, and so that it would write out the region boundaries in a more convenient form.

The output of the image segmentation performed by MegaWave2 produces a list of vertices that make up the polygonal arcs that form the region boundaries in the image. The edges specified by this output is simplified somewhat before it is provided as individual line segments to the insertion operation illustrated in FIGS. 23–26 to create an image structure map for the original image. Specifically, the output directly provided by the color image segmentation software is inserted into an image structure map for purposes of refining it. The rendering operation of the present invention makes it possible to render an image of the image structure map data, from which it possible to detect small rectangular regions that are only a pixel high or wide. These regions are removed, and the line segments that remain are collected an "arc" at a time. An arc is a collection of line segments for which all interior vertices are of degree two (where the degree of the vertex is the number of line segments that end there) and the vertices at the two ends of the arc are not of degree two. Each arc is segmented into a smaller number of line segments by the method of recursive subdivision. This method finds the vertex that lies the greatest distance from the line through the arc's endpoints; if the distance is below a threshold (one pixel in this case), the output is a segment that has the arc's endpoints. Otherwise the arc is divided into two at that vertex, and each piece of the arc is segmented the same way. The output is an arc of line segments between the vertices at which a subdivision occurred. No vertex on the subdivided arc is further away from the original arc than the threshold. The subdivided arcs are the line segments used as input to the dynamic insertion operation described in FIGS. 23–26 that create the image structure map.

D. The Machine and Software Product of the Invention

1. The machine of the present invention.

Figure 28:
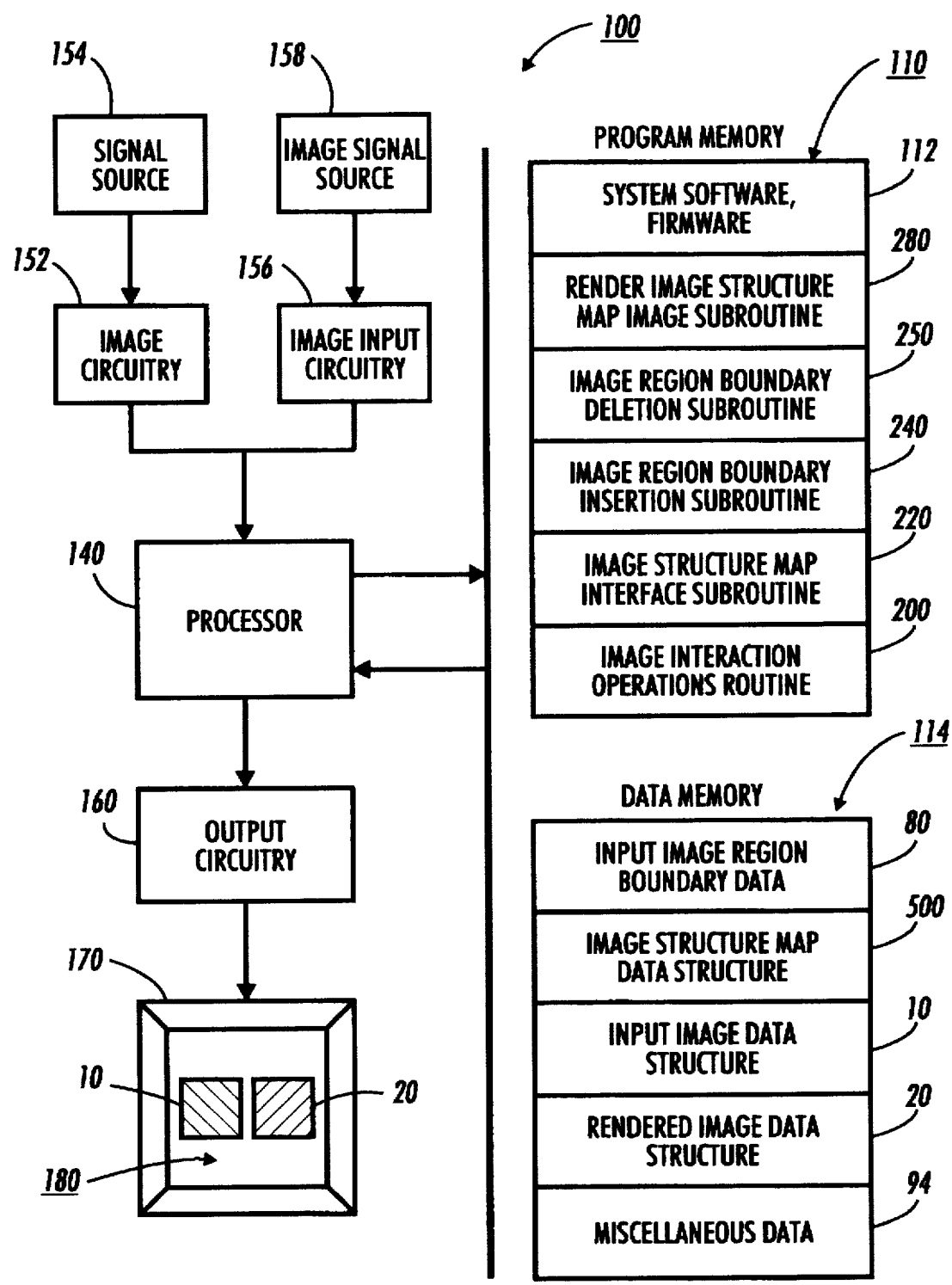
FIG. 28 is a simplified block diagram illustrating a machine in which the image interaction system of the present invention may be used.

FIG. 28 is a block diagram of a generalized, processor-controlled machine 100. The image interaction system of the present invention operates any machine having the common components, characteristics, and configuration of machine 100 illustrated in FIG. 28. The image structure map of the present invention may be used in any machine of the type illustrated in FIG. 28. For example, machine 100 may be a general purpose computer, a special purpose computer optimized for the types of operations performed by the present invention, or a combination of a general purpose computer and auxiliary special purpose hardware. The machine configuration illustrated at this high level is a known configuration. However, a machine such as machine 100 suitably programmed to embody the image interaction system of the present invention is not a standard or known configuration.

Machine 100 includes input circuitry 152 for receiving signals from a signal source 154. Signal source 154 may include any signal producing source that produces signals of the type needed by the present invention. Such sources include user interaction devices controllable by a human user that produce signals in response to actions by the user, such as a pointing device or a keyboard. Another type of user interaction device is a stylus device that the user moves over a special data collecting surface, which might be display area 180 of device 170. Device 170 shown in FIG. 28 is a conventional display device capable of presenting images, but machine 100 could also include a device called an electronic tablet, that is capable of producing input signals of the type used by the present invention. A user interaction input device has circuitry (not shown) for controlling the interaction between the user and display features of images presented in the display area 180 of device 170. For example, a pointing device (not shown) may have buttons which, when clicked or released, result in signals being sent through input circuitry 152, or there may be a pressure sensitive tip switch (not shown) which results in signals being sent through input circuitry 152 when the user presses the tip switch against data collecting surface and display area 180 when making gestures. Alternatively, signal source 154 may be an operation (not shown) that processor 140 is executing that provides input signals of the type referred to as image interaction signals 610 in FIG. 1 to processor 140 for processing according to the present invention. These input signals are forwarded via input circuitry 152 to processor 140 and may be stored in data memory 114.

Machine 100 also includes image input circuitry 156 which receives signals defining an original image data structure from an image signal source 158. Image signal source 158 may be any image capture device, such as a scanning device, a digital camera, or an interface device that produces a digital image data structure from another type of image signal.

In response to receiving an image interaction signal 610, processor 140 performs the general operations indicated in FIG. 3, interfacing with image structure map data structure 500 which may be stored in data memory 114, or in any other suitable storage device.

Processor 140 operates by accessing program memory 110 to retrieve instructions, which it then executes. Program memory 110 includes image interaction operations instructions 200 that implement the invention shown in box 200 of FIG. 1, and generally described in the block diagram of FIG. 3, as well as the embodiments of the invention described in the flowcharts of FIGS. 21 through 27. Program memory 110 includes instructions for any subroutines needed to implement the invention according to instructions 200; examples of these are also shown in program memory 110. During execution of the instructions, processor 140 may access data memory 114 to obtain or store data necessary for performing image structure map interaction. Data memory 114 stores the image structure map data structure 500 which would include the vertex data structures 520 of the type shown in FIG. 15, the fragment data structures 540 of the type shown in FIG. 16, and the region data structure 502 of the type shown in FIG. 17. Data memory 114 also stores original image data structure 10, rendered image data structure 20, and input image region boundary data 80 received from a user or from an automatic segmentation operation. Data memory 114 also stores various other miscellaneous data 94, including, for example, the list of new hot pixels produced by operation 310 of FIG. 24 when machine 100 implements the illustrated embodiment of the present invention.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility.

2. The software product of the present invention.

Figure 29:
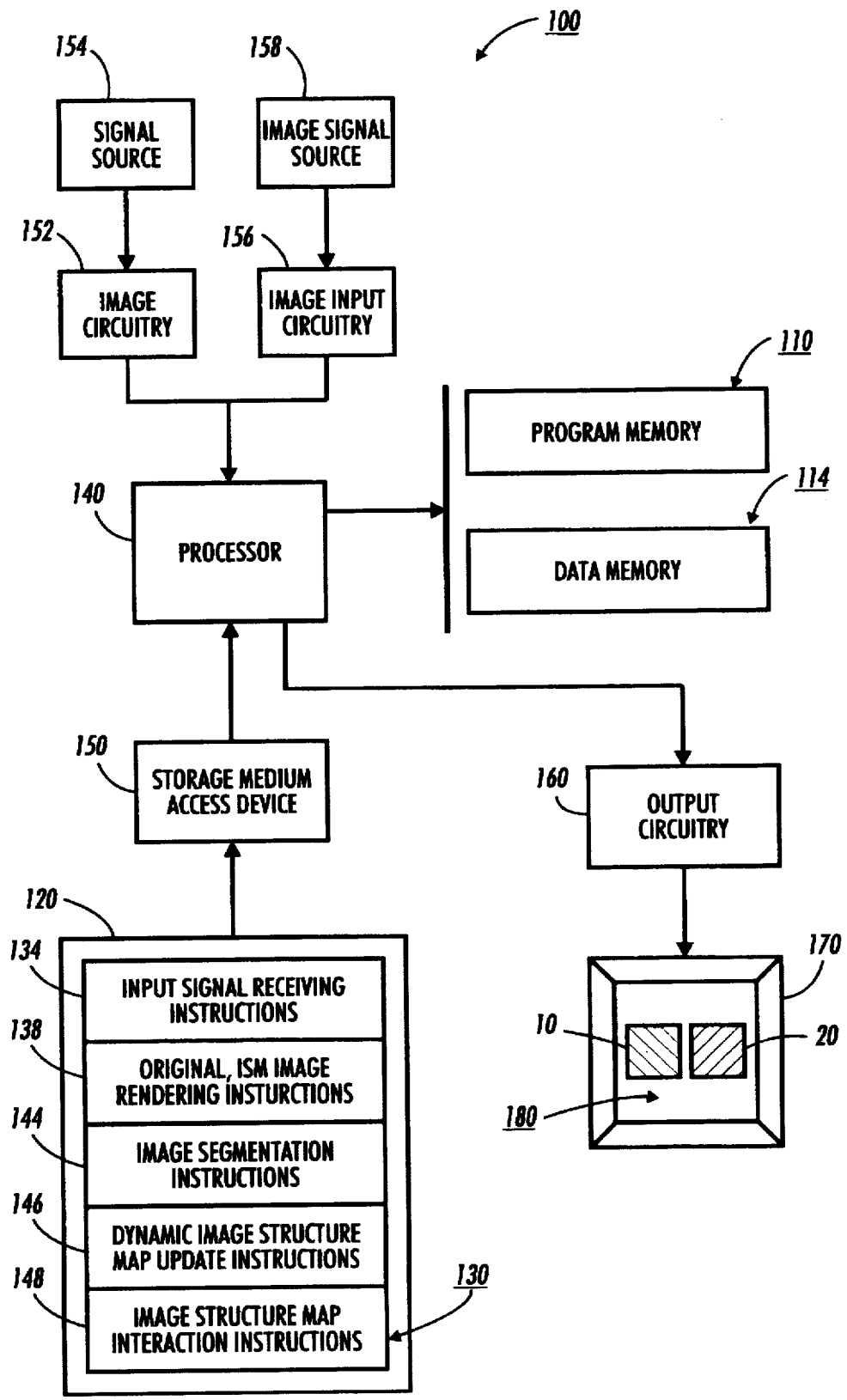
FIG. 29 is a simplified block diagram illustrating a software product that stores instruction data for implementing the image interaction system of the present invention on the machine of FIG. 28.

FIG. 29 shows software product 120, an article of manufacture that can be used in a machine that includes components like those included in machine 100. Software product 120 includes data storage medium 130 that can be accessed by storage medium access device 150. Software product 120 may be commercially available to a consumer in the form of a shrink-wrap package that includes data storage medium 130 and appropriate documentation describing the operation of the software product. In that case, a data storage medium is a physical medium that can store data. Examples of data storage media include magnetic media such as floppy disks and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples of storage medium access devices include floppy disk drives and CD-ROM readers.

Software product 120 may also be stored on a remotely-located storage device, such as a server, and may be commercially available to a purchaser in the form of a data stream indicating instructions for carrying out the present invention that are transmitted to the consumer over a communications facility from the remotely-located storage device. In the latter case, article 120 and data storage medium 130 are embodied in physical form as the remotely-located storage device; the consumer purchases a copy of the contents of data storage medium 130 (i.e., instruction data 134, 138, 144, 146 and 148 described in more detail below), but typically does not purchase the actual remotely-located storage device. When software product 120 is provided in the form of a data stream transmitted to the consumer over a communications facility from the remotely-located storage device, the data stream (including instruction data 134, 138, 144, 146 and 148) is stored in some suitable memory device of machine 100, which might be data memory 114 or a data storage medium locally accessible to machine 100, which would then be accessible using storage medium access device 150.

Data storage medium 130 stores instruction data 134, 138, 144, 146 and 148 which is provided to processor 140 for execution when image interaction according to the present invention is to be carried out. Note that data storage medium 130 in FIG. 29 shows only a representative portion of the instruction data stored thereon, and stores other instruction data that may be needed to carry out other operations shown in FIG. 3, that are also part of the present invention. The stored data include data indicating input signal receiving instructions 134; when these instructions are provided to processor 140, and processor 140 executes them, the machine is operated to perform operations for identifying the image interaction signals intended by the input signals, and for invoking one of the operations shown in FIG. 3.

The stored data also include data indicating image segmentation instructions 144; when these instructions are provided to processor 140, and processor 140 executes them, the machine is operated to perform the operations for automatically segmenting the original image data structure into regions indicating a smoothly varying signal and producing image region boundary data, as shown in box 604 of FIG. 4; if software product 120 implements the illustrated embodiment of the invention, then image segmentation instructions 144 automatically segment an original image into regions of constant color.

The stored data also include data indicating rendering instructions 138 for presenting original image 12 (FIG. 1) from original image data structure 10, or for rendering rendered image 20 using image structure map 500; when these instructions are provided to processor 140, and processor 140 executes them, the machine is operated to perform rendering operation 280 of FIG. 3.

The stored data further include data indicating dynamic image structure map update instructions 146; when these instructions are provided to processor 140, and processor 140 executes them, the machine is operated to perform the operations for modifying the image structure map data structure, as represented in boxes 240, 250 and 260 in FIG. 3; if software product 120 implements the illustrated embodiment of the invention, dynamic image structure map update instructions 146 perform the operations illustrated in the flowcharts of FIGS. 12, and 15-27.

Stored instruction data 134, 138, 144, 146 and 148 are capable of activating and controlling the action of a machine configured as shown for machine 100 in the very specific manner described above with respect to the processes referenced in FIGS. 3, 12 and 15-27. The article of manufacture, therefore, in its intended environment of use, i.e., a machine with a processor, controls the operation of the machine, and produces physical results when sensed by the processor. The processor responds to what is sensed and operates as directed by the stored instruction data.

It can be seen from the foregoing discussion that the method and software product of the present invention provide a powerful, efficient and flexible image representation in the form of an image structure map. The data structure provides for efficient spatially indexing into an original image, provides for image interaction because of the dynamic nature of the operations used to build and update the image structure map, and controls for accuracy by using a rounding operation to insure that image region boundary intersections are always represented as machine representable points in processor operations. The image structure map representation of an image supports interacting with images in a variety of applications.

While this invention has been described in conjunction with at least two specific embodiments thereof, the description was not intended to limit the invention to the embodiments illustrated. It is evident that many alternatives, modifications and variations will be apparent to those skilled in the art. Accordingly, the invention as herein described is intended to embrace all such alternatives, modifications and variations that fall within the scope of the appended claims.

What is claimed:

1. A method for operating a processor-controlled machine to dynamically interact with an image structure map data structure representing an original image in response to input interaction signals received from a user; the machine including input signal circuitry for receiving interaction signals from a user interaction device; memory for storing data; output circuitry connected to a display device for presenting images thereon; and a processor connected for accessing instruction data stored in the memory for operating the machine; the processor being further connected for receiving the input interaction signals from the user interaction device, and connected for providing image definition data defining images to the output circuitry for presenting the images on the display device; the method comprising:

receiving an image interaction signal from the input circuitry indicating a request from a user to dynamically modify an image structure map data structure, referred to as an image structure map; the image interaction signal including an input image location included in an input image definition data structure and an image interaction request;

the image structure map representing an original image definition data structure defining an original image in a form suitable for presenting the original image on the display device of the machine;

the image structure map representing the original image definition data structure as a partition of a two-dimensional (2D) plane induced by a set of intersecting image boundaries determined to be included in the original image into one or more region data items each indicating a respective image region in the original image formed by the set of intersecting image boundaries;

the image structure map, also referred to as an image structure map representation of the original image, being dynamically modifiable such that a selected image structure included in the image structure map is capable of being modified without recomputing all image structures included in the image structure map at the time of modification;

each region data item indicating a plurality of image region boundary data items; each image region boundary data item indicating a respective one of the set of intersecting image boundaries forming the respective image region; each region data item further indicating a signal property descriptor; the signal property descriptor having a value indicating a smoothly varying function of signals included in locations in the original image definition data structure determined to be included in the respective image region of the original image; and in response to receiving the image interaction signal, modifying the image structure map according to the image interaction request using the input image location by determining an image structure map location of a target image structure in the image structure map using the input image location; and modifying the target image structure in the image structure map according to the image interaction request such that only the target image structure and, when necessary, image structures associated with the target image structure, are modified in response to the request from the user.

2. The method of claim 1 for operating a processor-controlled machine to dynamically interact with an image structure map data structure wherein the request from the user to modify the image structure map is an insertion request to insert an image boundary in the image structure map representation of the original image; wherein the input image location included in the image interaction signal is a location of the image boundary in the original image; and wherein modifying the image structure map includes determining a region data item in the image structure map representation of the original image that includes the image boundary; and modifying the region data item such that the image boundary is inserted into the image structure map.

3. The method of claim 2 wherein the image location of the image boundary data item in the original image is produced by the user using the user interaction device to trace the image boundary data item in a displayed view of the original image.

4. The method of claim 2 wherein, when insertion of the image boundary data item creates a new image region in the image structure map, modifying the image structure map further includes inserting a new region data item in the image structure map, and computing a signal property descriptor for the new region data item.

5. The method of claim 1 for operating a processor-controlled machine to dynamically interact with an image structure map in response to user interaction signals wherein the input image location included in the image interaction signal is an image location in a rendered image data structure, referred to as a rendered image, such that the user interacts with the rendered image in order to modify the image structure map; the rendered image being displayed in the display area and being a displayed view of the image structure map representation of the original image; the rendered image showing display features indicating the region data items included in the image structure map representation of the original image; the rendered image optionally showing a value of the signal property descriptor for each respective region data item.

6. The method of claim 1 for operating a processor-controlled machine to interact with an image structure map data structure wherein a region data item in the image structure map represented by an image region in the original image includes at least one subregion referred to as a cell; the cell having a standardized geometric shape having a fixed number of bounded sides.

7. The method of claim 6 wherein the standardized geometric shape is a trapezoid; the partition of the 2D plane induced by the set of image boundary data items in the original image being referred to as a vertical cell decomposition.

8. The method of claim 1 for operating a processor-controlled machine to dynamically interact with an image structure map in response to user interaction signals wherein the request from the user to modify the image structure map is a request to compute a current value for the signal property descriptor for a selected image region in the original image; and wherein modifying the image structure map includes locating the region data item representing the selected image region in the image structure map representation of the original image using the image location in the original image;

determining image locations in the original image included in the selected image region using image structure map locations indicated by the region data item representing the selected image region;

computing the current value of the signal property descriptor for the selected image region using signal data indicated by the image locations in the original image; and updating the signal property descriptor indicated by the region data item in the image structure map with the current value.

9. The method of claim 1 for operating a processor-controlled machine to dynamically interact with an image structure map wherein the signal property descriptor is a color descriptor indicating a function of a color indicated by image locations in the original image determined to be included in an image region in the original image; and wherein an image boundary in the original image is determined by a discontinuity in color such that each region data item in the image structure map representation of the original image represents a coherent area of the original image having a substantially similar color.

10. The method of claim 9 wherein the color descriptor indicating the function of the color of the image locations in the original image indicates a constant function; the color descriptor indicating a single color for the image region.

11. The method of claim 9 wherein the color descriptor indicating the function of the color of the image locations in the original image is a linear function; the color descriptor indicating a sequence of linearly varying colors for the image region.

12. The method of claim 1 for operating a processor-controlled machine to interact with an image structure map wherein the set of image boundary data items in the original image from which the partition of the original image is produced is a set of line segments.

13. The method of claim 1 for operating a processor-controlled machine to interact with an image structure map wherein the original image data structure indicates a digital image representation of a continuous-tone image.

14. The method of claim 1 for operating a processor-controlled machine to dynamically interact with an image structure map wherein features observed in the original image have locations and orientations with respect to each other that define topological and geometric relationships among the features;

wherein image structures representing the features observed in the original image are stored in the image structure map in a manner that preserves topological and geometric consistency with the features observed in the original image; and wherein, when the input image location included in the image interaction signal is an original image location in the original image data structure, the original image location is capable of being used to spatially index into the image structure map to locate an image structure in the image structure map that represents a feature of the original image that includes the original image location.

15. The method of claim 1 wherein each intersection and endpoint location, referred to as an unrounded vertex, of an image boundary in the set of intersecting image boundaries forming an image region determined to be included in the original image is represented in the image structure map as a machine representable value computed according to a rounding operation applied to an unrounded vertex value of the unrounded vertex; the rounding operation producing a rounded vertex value for the respective unrounded vertex in a manner that preserves topological consistency between vertex locations in the original image and vertex locations in the image structure map.

16. The method of claim 15 wherein, when modifying the target image structure in the image structure map according to the image interaction request includes inserting an image boundary into the image structure map, modifying the target image structure includes applying the rounding operation to each unrounded vertex of the image boundary to produce a machine representable value for storing as the rounded vertex value in the image structure map.

17. The method of claim 16 wherein, when a first image boundary is inserted into the image structure map representation of the original image, the first image boundary is stored in the image structure map both as a region boundary data item having rounded vertex values and as a first unrounded image boundary data item; and wherein, when a second image boundary intersecting with the first image boundary is subsequently inserted into the image structure map, the rounding operation is applied to an unrounded intersection location of the second image boundary with the first unrounded image boundary data item; using the first unrounded image boundary data item to determine the unrounded intersection location ensuring that a machine representable value of a rounded vertex indicates a location and orientation in the image structure map representation of the original image that is topologically and geometrically consistent with a location and orientation of the respective unrounded intersection location determined to be included in the original image.

18. The method of claim 1 for operating a processor-controlled machine to dynamically interact with an image structure map in response to user interaction signals wherein the request from the user to modify the image structure map includes a request to invoke an automatic image segmentation operation for producing image boundaries for insertion into the image structure map;

wherein the input image location included in the image interaction signal is a location of a portion of the original image definition data structure;

wherein modifying the image structure map includes performing the automatic image segmentation operation using the portion of the original image definition data structure specified in the image interaction signal to produce a plurality of image boundary data items each indicating an image boundary determined to be included in the original image and an input image location in the original image data structure; and wherein modifying the image structure map includes automatically inserting each image boundary data item into the image structure map by determining a region data item in the image structure map representation of the original image that includes the image boundary and modifying the region data item such that the image boundary is inserted into the image structure map.

19. A method for operating a processor-controlled machine to dynamically interact with an image structure map data structure representing an original image in response to input interaction signals received from a user; the machine including input signal circuitry for receiving interaction signals from a user interaction device; memory for storing data; output circuitry connected to a display device for presenting images thereon; and a processor connected for accessing instruction data stored in the memory for operating the machine; the processor being further connected for receiving the input interaction signals from the user interaction device, and connected for providing image definition data defining images to the output circuitry for presenting the images on the display device; the method comprising:

storing in the memory an original image definition data structure defining the original image in a form suitable for presenting the original image on the display device;

receiving an image interaction signal from the input circuitry indicating a request from a user to dynamically insert an image boundary determined to be included in the original image data structure into an image structure map data structure, referred to as an image structure map; the image boundary, referred to as a selected image boundary, being identified by an image boundary location in the original image data structure;

the image structure map representing the original image definition data structure as a partition of a two-dimensional (2D) plane induced by a set of intersecting image boundaries determined to be included in the original image into one or more region data items each indicating an image region formed by the set of intersecting image boundaries; the image structure map spatially indexing the original image data structure such that an original image location in the original image data structure is able to be used to locate an image structure in the image structure map that represents a feature observed in the original image that includes the original image location;

the image structure map, also referred to as an image structure map representation of the original image, being dynamically modifiable such that an image boundary determined to be included in the original image definition data structure is capable of being inserted into the image structure map without recomputing all image structures included in the image structure map at the time of insertion thereof;

each region data item further indicating a plurality of image region boundary data items; each image region boundary data item indicating a respective one of the set of intersecting image boundaries forming the respective image region; each region data item further indicating a signal property descriptor; the signal property descriptor having a value indicating a smoothly varying function of signals included in locations in the original image definition data structure determined to be included in the respective image region of the original image; and in response to receiving the image interaction signal, inserting the selected image boundary into the image structure map by determining a target region data item included in the image structure map that includes the selected image boundary using the image boundary location in the original image data structure; and modifying the target region data item to indicate the selected image boundary.

20. The method of claim 19 wherein modifying the target region data item to indicate the selected image boundary includes representing each intersection location and endpoint location, referred to as an unrounded vertex, of the selected image boundary inserted into the image structure map as a machine representable value computed according to a rounding operation applied to an unrounded vertex value of each unrounded vertex; the rounding operation producing a rounded vertex value for the respective unfounded vertex in a manner that preserves topological consistency between the unrounded vertex location in the original image and the rounded vertex location in the image structure map.

21. The method of claim 20 wherein inserting the selected image boundary into the image structure map further includes storing the selected image boundary in the image structure map as an unrounded image boundary data item; and wherein, with respect to subsequent insertion of a next selected image boundary into the image structure map that intersects with the unrounded image boundary data item at an unrounded intersection location, the rounding operation is applied to the unrounded intersection location; using the unfounded image boundary data item to determine the unrounded intersection location ensuring that a machine representable value of a rounded vertex indicates a location and orientation in the image structure map representation of the original image that is topologically and geometrically consistent with a location and orientation of the unrounded intersection location determined to be included in the original image.

22. An article of manufacture for use by a machine; the machine including input signal circuitry for receiving interaction signals from a user interaction device; output circuitry connected to a display device for presenting images thereon; storage medium access circuitry for accessing a medium that stores data; and a processor connected for receiving the input interaction signals from the user interaction device, connected for providing image definition data defining images to the output circuitry for presenting the images on the display device, and connected for receiving data from the storage medium access circuitry; the article comprising:

a data storage medium that can be accessed by the storage medium access circuitry when the article is used by the machine; and data stored in the data storage medium so that the storage medium access circuitry can provide the stored data to the processor when the article is used by the machine; the stored data comprising instruction data indicating instructions the processor can execute;

the processor, in executing the instructions, receiving an image interaction signal from the input circuitry indicating a request from a user to dynamically modify an image structure map data structure, referred to as an image structure map; the image interaction signal including an input image location included in an input image definition data structure and an image interaction request;

the image structure map representing an original image definition data structure defining an original image in a form suitable for presenting the original image on the display device of the machine;

the image structure map representing the original image definition data structure as a partition of a two-dimensional (2D) plane induced by a set of intersecting image boundaries determined to be included in the original image into one or more region data items each indicating an image region formed by the set of intersecting image boundaries;

the image structure map, also referred to as an image structure map representation of the original image, being dynamically modifiable such that a selected image structure included in the image structure map is capable of being modified without recomputing all image structures included in the image structure map at the time of modification thereof;

each region data item indicating a plurality of image region boundary data items; each image region boundary data item indicating a respective one of the set of intersecting image boundaries forming the respective image region; each region data item further indicating a signal property descriptor; the signal property descriptor having a value indicating a smoothly varying function of signals included in locations in the original image definition data structure determined to be included in the respective image region of the original image;

the processor, further in executing the instructions, modifying the image structure map according to the image interaction request using the input image location, in response to receiving the image interaction signal; the processor, further in executing the instructions for modifying the image structure map, determining an image structure map location of a target image structure in the image structure map using the input image location; and modifying the target image structure in the image structure map according to the image interaction request such that only the target image structure and, when necessary, image structures associated with the target image structure, are modified in response to the request from the user.

23. The article of manufacture of claim 22 wherein features observed in the original image have locations and orientations with respect to each other that define topological and geometric relationships among the features;

image structures representing the features observed in the original image are stored in the image structure map in a manner that preserves topological and geometric consistency with the features observed in the original image; and when the input image location included in the image interaction signal is an original image location in the original image data structure, the processor, in executing the instructions, uses the original image location to spatially index into the image structure map to locate an image structure therein that represents a feature of the original image that includes the original image location.

24. The article of manufacture of claim 22 wherein the request the processor receives from the user to dynamically modify the image structure map is an insertion request to insert an image boundary in the image structure map representation of the original image;

the input image location included in the image interaction signal received by the processor is a location of the image boundary in the original image; and the processor, in executing the instructions for modifying the image structure map, determines a region data item in the image structure map representation of the original image that includes the image boundary; and modifies the region data item such that the image boundary is inserted into the image structure map.

* * * * *